US009886467B2

United States Patent
Kara et al.

(10) Patent No.: US 9,886,467 B2
(45) Date of Patent: Feb. 6, 2018

(54) SYSTEM AND METHOD FOR COMPARING AND VISUALIZING DATA ENTITIES AND DATA ENTITY SERIES

(71) Applicant: Palantir Technologies Inc., Palo Alto, CA (US)

(72) Inventors: Feridun Arda Kara, New York, NY (US); Bianca Rahill-Marier, New York, NY (US); Vincent Iadevaia, London (GB); Breanna Bunge, San Bruno, CA (US); Alexander Ryan, Palo Alto, CA (US); Brian Lee, Sunnyvale, CA (US); Simone Schaffer, Port Orchard, WA (US); Cihat Imamoglu, London (GB)

(73) Assignee: PLANTIR TECHNOLOGIES INC., Palo Alto, CA (US)

( * ) Notice: Subject to any disclaimer, the term of this patent is extended or adjusted under 35 U.S.C. 154(b) by 0 days.

(21) Appl. No.: 14/813,749

(22) Filed: Jul. 30, 2015

(65) Prior Publication Data
US 2016/0275122 A1 Sep. 22, 2016

Related U.S. Application Data

(60) Provisional application No. 62/135,456, filed on Mar. 19, 2015.

(51) Int. Cl.
*G06Q 10/00* (2012.01)
*G06F 17/30* (2006.01)

(52) U.S. Cl.
CPC .. *G06F 17/30342* (2013.01); *G06F 17/30528* (2013.01); *G06F 17/30554* (2013.01); *G06F 17/30598* (2013.01)

(58) Field of Classification Search
CPC ........................................................ G06Q 10/00
(Continued)

(56) References Cited

U.S. PATENT DOCUMENTS

| 5,109,399 A | 4/1992 | Thompson |
| 5,329,108 A | 7/1994 | Lamoure |

(Continued)

FOREIGN PATENT DOCUMENTS

| CN | 102546446 | 7/2012 |
| CN | 103167093 | 6/2013 |

(Continued)

OTHER PUBLICATIONS

"A First Look: Predicting Market Demand for Food Retail using a Huff Analysis," TRF Policy Solutions, Jul. 2012, pp. 30.
(Continued)

*Primary Examiner* — Robert D Rines
*Assistant Examiner* — Allison M Robinson
(74) *Attorney, Agent, or Firm* — Knobbe Martens Olson & Bear LLP

(57) ABSTRACT

Systems and methods for creating and using a workflow template for analyzing data entities stored in the one or more databases. After a desired workflow is identified, one or more series, data source, and/or entity restrictions based upon the workflow may be received. In addition, one or more chart configuration settings based upon the workflow may also be received. The restrictions and configuration settings may be saved as the workflow template. The workflow may then be performed by loading the saved workflow template, in order to automatically generate charts in accordance with the configuration settings of the template, based upon a received selection of series, data sources, and entities that adheres to the restrictions defined in the template.

6 Claims, 25 Drawing Sheets

(58) Field of Classification Search
USPC .............................................. 705/7.11–7.42
See application file for complete search history.

(56) References Cited

U.S. PATENT DOCUMENTS

| | | | |
|---|---|---|---|
| 5,632,009 A | 5/1997 | Rao et al. |
| 5,670,987 A | 9/1997 | Doi et al. |
| 5,781,704 A | 7/1998 | Rossmo |
| 5,798,769 A | 8/1998 | Chiu et al. |
| 5,845,300 A | 12/1998 | Comer |
| 6,057,757 A | 5/2000 | Arrowsmith et al. |
| 6,091,956 A | 7/2000 | Hollenberg |
| 6,161,098 A | 12/2000 | Wallman |
| 6,195,665 B1 | 2/2001 | Jarett |
| 6,219,053 B1 | 4/2001 | Tachibana et al. |
| 6,232,971 B1 | 5/2001 | Haynes |
| 6,247,019 B1 | 6/2001 | Davies |
| 6,279,018 B1 | 8/2001 | Kudrolli et al. |
| 6,341,310 B1 | 1/2002 | Leshem et al. |
| 6,366,933 B1 | 4/2002 | Ball et al. |
| 6,369,835 B1 | 4/2002 | Lin |
| 6,430,305 B1 | 8/2002 | Decker |
| 6,456,997 B1 | 9/2002 | Shukla |
| 6,549,944 B1 | 4/2003 | Weinberg et al. |
| 6,560,620 B1 | 5/2003 | Ching |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,642,945 B1 | 11/2003 | Sharpe |
| 6,714,936 B1 | 3/2004 | Nevin, III |
| 6,775,675 B1 | 8/2004 | Nwabueze et al. |
| 6,820,135 B1 | 11/2004 | Dingman |
| 6,828,920 B2 | 12/2004 | Owen et al. |
| 6,839,745 B1 | 1/2005 | Dingari et al. |
| 6,877,137 B1 | 4/2005 | Rivette et al. |
| 6,976,210 B1 | 12/2005 | Silva et al. |
| 6,978,419 B1 | 12/2005 | Kantrowitz |
| 6,980,984 B1 | 12/2005 | Huffman et al. |
| 6,985,950 B1 | 1/2006 | Hanson et al. |
| 7,036,085 B2 | 4/2006 | Barros |
| 7,043,702 B2 | 5/2006 | Chi et al. |
| 7,055,110 B2 | 5/2006 | Kupka et al. |
| 7,139,800 B2 | 11/2006 | Bellotti et al. |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witkowski |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,370,047 B2 | 5/2008 | Gorman |
| 7,379,811 B2 | 5/2008 | Rasmussen et al. |
| 7,379,903 B2 | 5/2008 | Joseph |
| 7,426,654 B2 | 9/2008 | Adams et al. |
| 7,454,466 B2 | 11/2008 | Bellotti et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,525,422 B2 | 4/2009 | Bishop et al. |
| 7,529,727 B2 | 5/2009 | Arning et al. |
| 7,529,734 B2 | 5/2009 | Dirisala |
| 7,558,677 B2 | 6/2009 | Jones |
| 7,574,409 B2 | 8/2009 | Patinkin |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,614,006 B2 | 11/2009 | Molander |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,703,021 B1 | 4/2010 | Flam |
| 7,706,817 B2 | 4/2010 | Bamrah et al. |
| 7,712,049 B2 | 5/2010 | Williams et al. |
| 7,716,077 B1 | 5/2010 | Mikurak |
| 7,725,530 B2 | 5/2010 | Sah et al. |
| 7,725,547 B2 | 5/2010 | Albertson et al. |
| 7,730,082 B2 | 6/2010 | Sah et al. |
| 7,730,109 B2 | 6/2010 | Rohrs et al. |
| 7,770,100 B2 | 8/2010 | Chamberlain et al. |
| 7,805,457 B1 | 9/2010 | Viola et al. |
| 7,809,703 B2 | 10/2010 | Balabhadrapatruni et al. |
| 7,818,658 B2 | 10/2010 | Chen |
| 7,870,493 B2 | 1/2011 | Pall et al. |
| 7,894,984 B2 | 2/2011 | Rasmussen et al. |
| 7,899,611 B2 | 3/2011 | Downs et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,941,321 B2 | 5/2011 | Greenstein et al. |
| 7,962,281 B2 | 6/2011 | Rasmussen et al. |
| 7,962,495 B2 | 6/2011 | Jain et al. |
| 7,962,848 B2 | 6/2011 | Bertram |
| 7,970,240 B1 | 6/2011 | Chao et al. |
| 7,971,150 B2 | 6/2011 | Raskutti et al. |
| 7,984,374 B2 | 6/2011 | Caro et al. |
| 8,001,465 B2 | 8/2011 | Kudrolli et al. |
| 8,001,482 B2 | 8/2011 | Bhattiprolu et al. |
| 8,010,545 B2 | 8/2011 | Stefik et al. |
| 8,015,487 B2 | 9/2011 | Roy et al. |
| 8,024,778 B2 | 9/2011 | Cash et al. |
| 8,036,632 B1 | 10/2011 | Cona et al. |
| 8,036,971 B2 | 10/2011 | Aymeloglu et al. |
| 8,046,283 B2 | 10/2011 | Burns |
| 8,054,756 B2 | 11/2011 | Chand et al. |
| 8,103,543 B1 | 1/2012 | Zwicky |
| 8,134,457 B2 | 3/2012 | Velipasalar et al. |
| 8,145,703 B2 | 3/2012 | Frishert et al. |
| 8,185,819 B2 | 5/2012 | Sah et al. |
| 8,214,361 B1 | 7/2012 | Sandler et al. |
| 8,214,764 B2 | 7/2012 | Gemmell et al. |
| 8,225,201 B2 | 7/2012 | Michael |
| 8,229,902 B2 | 7/2012 | Vishniac et al. |
| 8,229,947 B2 | 7/2012 | Fujinaga |
| 8,230,333 B2 | 7/2012 | Decherd et al. |
| 8,271,461 B2 | 9/2012 | Pike et al. |
| 8,280,880 B1 | 10/2012 | Aymeloglu et al. |
| 8,290,838 B1 | 10/2012 | Thakur et al. |
| 8,290,926 B2 | 10/2012 | Ozzie et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,302,855 B2 | 11/2012 | Ma et al. |
| 8,312,367 B2 | 11/2012 | Foster |
| 8,312,546 B2 | 11/2012 | Alme |
| 8,352,881 B2 | 1/2013 | Champion et al. |
| 8,368,695 B2 | 2/2013 | Howell et al. |
| 8,397,171 B2 | 3/2013 | Klassen et al. |
| 8,412,707 B1 | 4/2013 | Mianji |
| 8,447,722 B1 | 5/2013 | Ahuja et al. |
| 8,452,790 B1 | 5/2013 | Mianji |
| 8,463,036 B1 | 6/2013 | Ramesh et al. |
| 8,473,454 B2 | 6/2013 | Evanitsky et al. |
| 8,484,115 B2 | 7/2013 | Aymeloglu et al. |
| 8,489,331 B2 | 7/2013 | Kopf et al. |
| 8,489,641 B1 | 7/2013 | Seefeld et al. |
| 8,494,984 B2 | 7/2013 | Hwang et al. |
| 8,510,743 B2 | 8/2013 | Hackborn et al. |
| 8,514,082 B2 | 8/2013 | Cova et al. |
| 8,515,207 B2 | 8/2013 | Chau |
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,577,911 B1 | 11/2013 | Stepinski et al. |
| 8,589,273 B2 | 11/2013 | Creeden et al. |
| 8,595,234 B2 | 11/2013 | Siripurapu et al. |
| 8,620,641 B2 | 12/2013 | Farnsworth et al. |
| 8,646,080 B2 | 2/2014 | Williamson et al. |
| 8,639,757 B1 | 3/2014 | Adams et al. |
| 8,676,857 B1 | 3/2014 | Adams et al. |
| 8,688,573 B1 | 4/2014 | Rukonic et al. |
| 8,689,108 B1 | 4/2014 | Duffield et al. |
| 8,713,467 B1 | 4/2014 | Goldenberg et al. |

(56) References Cited

U.S. PATENT DOCUMENTS

| | | |
|---|---|---|
| 8,726,379 B1 | 5/2014 | Stiansen et al. |
| 8,739,278 B2 | 5/2014 | Varghese |
| 8,799,799 B1 | 5/2014 | Cervelli et al. |
| 8,742,934 B1 | 6/2014 | Sarpy et al. |
| 8,744,890 B1 * | 6/2014 | Bernier ............ G06Q 10/0631 705/7.11 |
| 8,745,516 B2 | 6/2014 | Mason et al. |
| 8,781,169 B2 | 7/2014 | Jackson et al. |
| 8,787,939 B2 | 7/2014 | Papakipos et al. |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,868,537 B1 | 10/2014 | Colgrove et al. |
| 8,917,274 B2 | 12/2014 | Ma et al. |
| 8,924,388 B2 | 12/2014 | Elliot et al. |
| 8,924,389 B2 | 12/2014 | Elliot et al. |
| 8,924,872 B1 | 12/2014 | Bogomolov et al. |
| 8,937,619 B2 | 1/2015 | Sharma et al. |
| 8,938,686 B1 | 1/2015 | Erenrich et al. |
| 8,949,164 B1 | 2/2015 | Mohler |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,043,696 B1 | 5/2015 | Meiklejohn et al. |
| 9,043,894 B1 | 5/2015 | Dennison et al. |
| 9,100,428 B1 | 8/2015 | Visbal |
| 9,116,975 B2 | 8/2015 | Shankar et al. |
| 2002/0033848 A1 | 3/2002 | Sciammarella et al. |
| 2002/0065708 A1 | 5/2002 | Senay et al. |
| 2002/0091707 A1 | 7/2002 | Keller |
| 2002/0095360 A1 | 7/2002 | Joao |
| 2002/0095658 A1 | 7/2002 | Shulman |
| 2002/0103705 A1 | 8/2002 | Brady |
| 2002/0116120 A1 | 8/2002 | Ruiz et al. |
| 2002/0147805 A1 | 10/2002 | Leshem et al. |
| 2002/0174201 A1 | 11/2002 | Ramer et al. |
| 2002/0194119 A1 | 12/2002 | Wright et al. |
| 2003/0028560 A1 | 2/2003 | Kudrolli et al. |
| 2003/0039948 A1 | 2/2003 | Donahue |
| 2003/0126102 A1 | 7/2003 | Borthwick |
| 2003/0140106 A1 | 7/2003 | Raguseo |
| 2003/0144868 A1 | 7/2003 | MacIntyre et al. |
| 2003/0163352 A1 | 8/2003 | Surpin et al. |
| 2003/0225755 A1 | 12/2003 | Iwayama et al. |
| 2003/0229848 A1 | 12/2003 | Arend et al. |
| 2004/0032432 A1 | 2/2004 | Baynger |
| 2004/0034570 A1 | 2/2004 | Davis |
| 2004/0064256 A1 | 4/2004 | Barinek et al. |
| 2004/0085318 A1 | 5/2004 | Hassler et al. |
| 2004/0095349 A1 | 5/2004 | Bito et al. |
| 2004/0111410 A1 | 6/2004 | Burgoon et al. |
| 2004/0126840 A1 | 7/2004 | Cheng et al. |
| 2004/0143602 A1 | 7/2004 | Ruiz et al. |
| 2004/0143796 A1 | 7/2004 | Lerner et al. |
| 2004/0153418 A1 | 8/2004 | Hanweck |
| 2004/0163039 A1 | 8/2004 | McPherson et al. |
| 2004/0193600 A1 | 9/2004 | Kaasten et al. |
| 2004/0221223 A1 | 11/2004 | Yu et al. |
| 2004/0236688 A1 | 11/2004 | Bozeman |
| 2004/0260702 A1 | 12/2004 | Cragun et al. |
| 2004/0267746 A1 | 12/2004 | Marcjan et al. |
| 2005/0010472 A1 | 1/2005 | Quatse et al. |
| 2005/0027705 A1 | 2/2005 | Sadri et al. |
| 2005/0028094 A1 | 2/2005 | Allyn |
| 2005/0039119 A1 | 2/2005 | Parks et al. |
| 2005/0065811 A1 | 3/2005 | Chu et al. |
| 2005/0080769 A1 | 4/2005 | Gemmell |
| 2005/0086207 A1 | 4/2005 | Heuer et al. |
| 2005/0125715 A1 | 6/2005 | Franco et al. |
| 2005/0162523 A1 | 7/2005 | Darrell et al. |
| 2005/0166144 A1 | 7/2005 | Gross |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0210409 A1 | 9/2005 | Jou |
| 2005/0246327 A1 | 11/2005 | Yeung et al. |
| 2005/0251786 A1 | 11/2005 | Citron et al. |
| 2006/0026120 A1 | 2/2006 | Carolan et al. |
| 2006/0026170 A1 | 2/2006 | Kreitler et al. |
| 2006/0059139 A1 | 3/2006 | Robinson |
| 2006/0074881 A1 | 4/2006 | Vembu et al. |
| 2006/0080619 A1 | 4/2006 | Carlson et al. |
| 2006/0129746 A1 | 6/2006 | Porter |
| 2006/0139375 A1 | 6/2006 | Rasmussen et al. |
| 2006/0142949 A1 | 6/2006 | Helt |
| 2006/0143034 A1 * | 6/2006 | Rothermel ............ G06Q 10/10 705/301 |
| 2006/0143075 A1 | 6/2006 | Carr et al. |
| 2006/0143079 A1 | 6/2006 | Basak et al. |
| 2006/0149596 A1 | 7/2006 | Surpin et al. |
| 2006/0203337 A1 | 9/2006 | White |
| 2006/0218637 A1 | 9/2006 | Thomas et al. |
| 2006/0241974 A1 | 10/2006 | Chao et al. |
| 2006/0242040 A1 | 10/2006 | Rader |
| 2006/0242630 A1 | 10/2006 | Koike et al. |
| 2006/0271277 A1 | 11/2006 | Hu et al. |
| 2006/0279630 A1 | 12/2006 | Aggarwal et al. |
| 2007/0000999 A1 | 1/2007 | Kubo et al. |
| 2007/0011150 A1 | 1/2007 | Frank |
| 2007/0011304 A1 | 1/2007 | Error |
| 2007/0016363 A1 | 1/2007 | Huang et al. |
| 2007/0038646 A1 | 2/2007 | Thota |
| 2007/0038962 A1 | 2/2007 | Fuchs et al. |
| 2007/0057966 A1 | 3/2007 | Ohno et al. |
| 2007/0078832 A1 | 4/2007 | Ott et al. |
| 2007/0083541 A1 | 4/2007 | Fraleigh et al. |
| 2007/0094389 A1 | 4/2007 | Nussey et al. |
| 2007/0150369 A1 | 6/2007 | Zivin |
| 2007/0174760 A1 | 7/2007 | Chamberlain et al. |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0240062 A1 | 10/2007 | Christena et al. |
| 2007/0266336 A1 | 11/2007 | Nojima et al. |
| 2007/0284433 A1 | 12/2007 | Domenica et al. |
| 2007/0294643 A1 | 12/2007 | Kyle |
| 2008/0040684 A1 | 2/2008 | Crump |
| 2008/0051989 A1 | 2/2008 | Welsh |
| 2008/0052142 A1 | 2/2008 | Bailey et al. |
| 2008/0077597 A1 | 3/2008 | Butler |
| 2008/0077642 A1 | 3/2008 | Carbone et al. |
| 2008/0104019 A1 | 5/2008 | Nath |
| 2008/0126951 A1 | 5/2008 | Sood et al. |
| 2008/0155440 A1 | 6/2008 | Trevor et al. |
| 2008/0162616 A1 | 7/2008 | Gross et al. |
| 2008/0195417 A1 | 8/2008 | Surpin et al. |
| 2008/0195608 A1 | 8/2008 | Clover |
| 2008/0222295 A1 | 9/2008 | Robinson et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0270328 A1 * | 10/2008 | Lafferty ............... E21B 43/00 706/12 |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0301643 A1 | 12/2008 | Appleton et al. |
| 2008/0313132 A1 | 12/2008 | Hao et al. |
| 2009/0002492 A1 | 1/2009 | Velipasalar et al. |
| 2009/0027418 A1 | 1/2009 | Maru et al. |
| 2009/0030915 A1 | 1/2009 | Winter et al. |
| 2009/0055251 A1 | 2/2009 | Shah et al. |
| 2009/0088964 A1 | 4/2009 | Schaaf et al. |
| 2009/0106178 A1 | 4/2009 | Chu |
| 2009/0112745 A1 | 4/2009 | Stefanescu |
| 2009/0119309 A1 | 5/2009 | Gibson et al. |
| 2009/0125359 A1 * | 5/2009 | Knapic ............... G06F 9/542 705/7.23 |
| 2009/0125369 A1 | 5/2009 | Kloostra et al. |
| 2009/0125459 A1 | 5/2009 | Norton et al. |
| 2009/0132921 A1 | 5/2009 | Hwangbo et al. |

(56) References Cited

U.S. PATENT DOCUMENTS

| | | |
|---|---|---|
| 2009/0132953 A1 | 5/2009 | Reed et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0177962 A1 | 7/2009 | Gusmorino et al. |
| 2009/0179892 A1 | 7/2009 | Tsuda et al. |
| 2009/0187464 A1 | 7/2009 | Bai et al. |
| 2009/0187546 A1 | 7/2009 | Whyte et al. |
| 2009/0187548 A1 | 7/2009 | Ji et al. |
| 2009/0222400 A1 | 9/2009 | Kupershmidt et al. |
| 2009/0222760 A1 | 9/2009 | Halverson et al. |
| 2009/0234720 A1 | 9/2009 | George et al. |
| 2009/0249244 A1 | 10/2009 | Robinson et al. |
| 2009/0271343 A1 | 10/2009 | Vaiciulis et al. |
| 2009/0281839 A1 | 11/2009 | Lynn et al. |
| 2009/0287470 A1 | 11/2009 | Farnsworth et al. |
| 2009/0292626 A1 | 11/2009 | Oxford |
| 2009/0307049 A1 | 12/2009 | Elliott et al. |
| 2009/0313463 A1 | 12/2009 | Pang et al. |
| 2009/0319418 A1 | 12/2009 | Herz |
| 2010/0011282 A1 | 1/2010 | Dollard et al. |
| 2010/0042922 A1 | 2/2010 | Bradateanu et al. |
| 2010/0057622 A1 | 3/2010 | Faith et al. |
| 2010/0057716 A1 | 3/2010 | Stefik et al. |
| 2010/0070523 A1 | 3/2010 | Delgo et al. |
| 2010/0070842 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0098318 A1 | 4/2010 | Anderson |
| 2010/0100963 A1 | 4/2010 | Mahaffey |
| 2010/0103124 A1 | 4/2010 | Kruzeniski et al. |
| 2010/0114887 A1 | 5/2010 | Conway et al. |
| 2010/0122152 A1 | 5/2010 | Chamberlain et al. |
| 2010/0131457 A1 | 5/2010 | Heimendinger |
| 2010/0161735 A1 | 6/2010 | Sharma |
| 2010/0162176 A1 | 6/2010 | Dunton |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0228812 A1 | 9/2010 | Uomini |
| 2010/0250412 A1 | 9/2010 | Wagner |
| 2010/0262688 A1 | 10/2010 | Hussain et al. |
| 2010/0280857 A1 | 11/2010 | Liu et al. |
| 2010/0293174 A1 | 11/2010 | Bennett et al. |
| 2010/0306713 A1 | 12/2010 | Geisner et al. |
| 2010/0313119 A1 | 12/2010 | Baldwin et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0029526 A1 | 2/2011 | Knight et al. |
| 2011/0047159 A1 | 2/2011 | Baid et al. |
| 2011/0060753 A1 | 3/2011 | Shaked et al. |
| 2011/0061013 A1 | 3/2011 | Bilicki et al. |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0093327 A1 | 4/2011 | Fordyce, III et al. |
| 2011/0099133 A1 | 4/2011 | Chang et al. |
| 2011/0117878 A1 | 5/2011 | Barash et al. |
| 2011/0119100 A1 | 5/2011 | Ruhl et al. |
| 2011/0137766 A1 | 6/2011 | Rasmussen et al. |
| 2011/0153384 A1 | 6/2011 | Horne et al. |
| 2011/0154240 A1 | 6/2011 | Yamamoto et al. |
| 2011/0161096 A1 | 6/2011 | Buehler et al. |
| 2011/0167710 A1 | 7/2011 | Ramakrishnan et al. |
| 2011/0170799 A1 | 7/2011 | Carrino et al. |
| 2011/0173032 A1 | 7/2011 | Payne et al. |
| 2011/0173093 A1 | 7/2011 | Psota et al. |
| 2011/0185316 A1 | 7/2011 | Reid et al. |
| 2011/0208724 A1 | 8/2011 | Jones et al. |
| 2011/0213655 A1 | 9/2011 | Henkin |
| 2011/0218934 A1 | 9/2011 | Elser |
| 2011/0219450 A1 | 9/2011 | McDougal et al. |
| 2011/0225198 A1 | 9/2011 | Edwards et al. |
| 2011/0238553 A1 | 9/2011 | Raj et al. |
| 2011/0258158 A1 | 10/2011 | Resende et al. |
| 2011/0270604 A1 | 11/2011 | Qi et al. |
| 2011/0270705 A1 | 11/2011 | Parker |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0310005 A1 | 12/2011 | Chen et al. |
| 2011/0314007 A1 | 12/2011 | Dassa et al. |
| 2012/0011238 A1 | 1/2012 | Rathod |
| 2012/0019559 A1 | 1/2012 | Siler et al. |
| 2012/0022945 A1 | 1/2012 | Falkenborg et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0053971 A1 | 3/2012 | Ludvigsen et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0066296 A1 | 3/2012 | Appleton et al. |
| 2012/0072825 A1 | 3/2012 | Sherkin et al. |
| 2012/0079363 A1 | 3/2012 | Folting et al. |
| 2012/0084118 A1 | 4/2012 | Bai et al. |
| 2012/0106801 A1 | 5/2012 | Jackson |
| 2012/0117082 A1 | 5/2012 | Koperda et al. |
| 2012/0131512 A1 | 5/2012 | Takeuchi et al. |
| 2012/0144335 A1 | 6/2012 | Abeln et al. |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0170847 A1 | 7/2012 | Tsukidate |
| 2012/0173381 A1 | 7/2012 | Smith |
| 2012/0173985 A1 | 7/2012 | Peppel |
| 2012/0196557 A1 | 8/2012 | Reich et al. |
| 2012/0196558 A1 | 8/2012 | Reich et al. |
| 2012/0203708 A1 | 8/2012 | Psota et al. |
| 2012/0208636 A1 | 8/2012 | Feige |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0284345 A1 | 11/2012 | Costenaro et al. |
| 2012/0290879 A1 | 11/2012 | Shibuya et al. |
| 2012/0296907 A1 | 11/2012 | Long et al. |
| 2012/0311684 A1 | 12/2012 | Paulsen et al. |
| 2012/0323888 A1 | 12/2012 | Osann, Jr. |
| 2012/0330973 A1 | 12/2012 | Ghuneim et al. |
| 2013/0006426 A1 | 1/2013 | Healey et al. |
| 2013/0006725 A1 | 1/2013 | Simanek et al. |
| 2013/0006916 A1 | 1/2013 | McBride et al. |
| 2013/0018796 A1 | 1/2013 | Kolhatkar et al. |
| 2013/0046635 A1 | 2/2013 | Grigg et al. |
| 2013/0046842 A1 | 2/2013 | Muntz et al. |
| 2013/0057551 A1 | 3/2013 | Ebert et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0096988 A1 | 4/2013 | Grossman et al. |
| 2013/0097482 A1 | 4/2013 | Marantz et al. |
| 2013/0101159 A1 | 4/2013 | Chao |
| 2013/0110822 A1 | 5/2013 | Ikeda et al. |
| 2013/0110877 A1 | 5/2013 | Bonham et al. |
| 2013/0111320 A1 | 5/2013 | Campbell et al. |
| 2013/0117651 A1 | 5/2013 | Waldman et al. |
| 2013/0150004 A1 | 6/2013 | Rosen |
| 2013/0151148 A1 | 6/2013 | Parundekar et al. |
| 2013/0151388 A1 | 6/2013 | Falkenborg et al. |
| 2013/0151453 A1 | 6/2013 | Bhanot et al. |
| 2013/0157234 A1 | 6/2013 | Gulli et al. |
| 2013/0166480 A1 | 6/2013 | Popescu et al. |

(56) References Cited

U.S. PATENT DOCUMENTS

| | | | |
|---|---|---|---|
| 2013/0166550 A1 | 6/2013 | Buchmann et al. | |
| 2013/0176321 A1 | 7/2013 | Mitchell et al. | |
| 2013/0179420 A1 | 7/2013 | Park et al. | |
| 2013/0185307 A1 | 7/2013 | El-Yaniv et al. | |
| 2013/0224696 A1 | 8/2013 | Wolfe et al. | |
| 2013/0226318 A1* | 8/2013 | Procyk | G05B 13/021 700/33 |
| 2013/0226953 A1 | 8/2013 | Markovich et al. | |
| 2013/0238616 A1 | 9/2013 | Rose et al. | |
| 2013/0246170 A1 | 9/2013 | Gross et al. | |
| 2013/0246537 A1 | 9/2013 | Gaddala | |
| 2013/0251233 A1 | 9/2013 | Yang et al. | |
| 2013/0262527 A1 | 10/2013 | Hunter et al. | |
| 2013/0263019 A1 | 10/2013 | Castellanos et al. | |
| 2013/0267207 A1 | 10/2013 | Hao et al. | |
| 2013/0268520 A1 | 10/2013 | Fisher et al. | |
| 2013/0279757 A1 | 10/2013 | Kephart | |
| 2013/0282696 A1 | 10/2013 | John et al. | |
| 2013/0290011 A1 | 10/2013 | Lynn et al. | |
| 2013/0290825 A1 | 10/2013 | Arndt et al. | |
| 2013/0297619 A1 | 11/2013 | Chandarsekaran et al. | |
| 2013/0311375 A1 | 11/2013 | Priebatsch | |
| 2014/0012796 A1 | 1/2014 | Petersen et al. | |
| 2014/0019936 A1 | 1/2014 | Cohanoff | |
| 2014/0032506 A1 | 1/2014 | Hoey et al. | |
| 2014/0033010 A1 | 1/2014 | Richardt et al. | |
| 2014/0040371 A1 | 2/2014 | Gurevich et al. | |
| 2014/0047357 A1 | 2/2014 | Alfaro et al. | |
| 2014/0059038 A1 | 2/2014 | McPherson et al. | |
| 2014/0067611 A1 | 3/2014 | Adachi et al. | |
| 2014/0068487 A1 | 3/2014 | Steiger et al. | |
| 2014/0095273 A1 | 4/2014 | Tang et al. | |
| 2014/0095509 A1 | 4/2014 | Patton | |
| 2014/0108068 A1 | 4/2014 | Williams | |
| 2014/0108380 A1 | 4/2014 | Gotz et al. | |
| 2014/0108985 A1 | 4/2014 | Scott et al. | |
| 2014/0123279 A1 | 5/2014 | Bishop et al. | |
| 2014/0129261 A1 | 5/2014 | Bothwell et al. | |
| 2014/0136285 A1 | 5/2014 | Carvalho | |
| 2014/0143009 A1 | 5/2014 | Brice et al. | |
| 2014/0149436 A1 | 5/2014 | Bahrami et al. | |
| 2014/0156527 A1 | 6/2014 | Grigg et al. | |
| 2014/0157172 A1 | 6/2014 | Peery et al. | |
| 2014/0164502 A1 | 6/2014 | Khodorenko et al. | |
| 2014/0189536 A1 | 7/2014 | Lange et al. | |
| 2014/0195515 A1 | 7/2014 | Baker et al. | |
| 2014/0195887 A1 | 7/2014 | Ellis et al. | |
| 2014/0214579 A1 | 7/2014 | Shen et al. | |
| 2014/0222521 A1* | 8/2014 | Chait | G06Q 10/0637 705/7.36 |
| 2014/0222793 A1 | 8/2014 | Sadkin et al. | |
| 2014/0267294 A1 | 9/2014 | Ma | |
| 2014/0267295 A1 | 9/2014 | Sharma | |
| 2014/0279824 A1 | 9/2014 | Tamayo | |
| 2014/0316911 A1 | 10/2014 | Gross | |
| 2014/0333651 A1 | 11/2014 | Cervelli et al. | |
| 2014/0337772 A1 | 11/2014 | Cervelli et al. | |
| 2014/0344230 A1 | 11/2014 | Krause et al. | |
| 2014/0358829 A1 | 12/2014 | Hurwitz | |
| 2014/0366132 A1 | 12/2014 | Stiansen et al. | |
| 2015/0019394 A1 | 1/2015 | Unser et al. | |
| 2015/0046870 A1 | 2/2015 | Goldenberg et al. | |
| 2015/0089424 A1 | 3/2015 | Duffield et al. | |
| 2015/0100897 A1 | 4/2015 | Sun et al. | |
| 2015/0100907 A1 | 4/2015 | Erenrich et al. | |
| 2015/0106379 A1 | 4/2015 | Elliot et al. | |
| 2015/0134666 A1 | 5/2015 | Gattiker et al. | |
| 2015/0169709 A1 | 6/2015 | Kara et al. | |
| 2015/0169726 A1 | 6/2015 | Kara et al. | |
| 2015/0170077 A1 | 6/2015 | Kara et al. | |
| 2015/0178877 A1 | 6/2015 | Bogomolov et al. | |
| 2015/0186821 A1 | 7/2015 | Wang et al. | |
| 2015/0187036 A1 | 7/2015 | Wang et al. | |
| 2015/0188872 A1 | 7/2015 | White | |
| 2015/0227295 A1 | 8/2015 | Meiklejohn et al. | |

FOREIGN PATENT DOCUMENTS

| | | |
|---|---|---|
| CN | 102054015 | 5/2014 |
| DE | 102014103482 | 9/2014 |
| DE | 102014204827 | 9/2014 |
| DE | 102014204830 | 9/2014 |
| DE | 102014204834 | 9/2014 |
| DE | 102014215621 | 2/2015 |
| EP | 1672527 | 6/2006 |
| EP | 2551799 | 1/2013 |
| EP | 2560134 | 2/2013 |
| EP | 2778977 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2881868 | 6/2015 |
| EP | 2884439 | 6/2015 |
| EP | 2884440 | 6/2015 |
| EP | 2889814 | 7/2015 |
| EP | 2891992 | 7/2015 |
| EP | 2892197 | 7/2015 |
| EP | 2911100 | 8/2015 |
| EP | 3070624 | 9/2016 |
| GB | 2516155 | 1/2015 |
| GB | 2518745 | 4/2015 |
| NL | 2012778 | 11/2014 |
| NL | 2013306 | 2/2015 |
| NZ | 624557 | 12/2014 |
| WO | WO 00/009529 | 2/2000 |
| WO | WO 02/065353 | 8/2002 |
| WO | WO 2005/104736 | 11/2005 |
| WO | WO 2008/064207 | 5/2008 |
| WO | WO 2009/061501 | 5/2009 |
| WO | WO 2010/000014 | 1/2010 |
| WO | WO 2010/030913 | 3/2010 |
| WO | WO 2013/010157 | 1/2013 |
| WO | WO 2013/102892 | 7/2013 |

OTHER PUBLICATIONS

"A Quick Guide to UniProtKB Swiss-Prot & TrEMBL," Sep. 2011, pp. 2.

"A Word About Banks and the Laundering of Drug Money," Aug. 18, 2012, http://www.golemxiv.co.uk/2012/08/a-word-about-banks-and-the-laundering-of-drug-money/.

Acklen, Laura, "Absolute Beginner's Guide to Microsoft Word 2003," Dec. 24, 2003, pp. 15-18, 34-41, 308-316.

Amnet, "5 Great Tools for Visualizing Your Twitter Followers," posted Aug. 4, 2010, http://www.amnetblog.com/component/content/article/115-5-grate-tools-for-visualizing-your-twitter-followers.html.

Ananiev et al., "The New Modality API," http://web.archive.org/web/20061211011958/http://java.sun.com/developer/technicalArticles/J2SE/Desktop/javase6/modality/ Jan. 21, 2006, pp. 8.

Appacts, "Smart Thinking for Super Apps," http://www.appacts.com Printed Jul. 18, 2013 in 4 pages.

Apsalar, "Data Powered Mobile Advertising," "Free Mobile App Analytics" and various analytics related screen shots http://apsalar.com Printed Jul. 18, 2013 in 8 pages.

Bluttman et al., "Excel Formulas and Functions for Dummies," 2005, Wiley Publishing, Inc., pp. 280, 284-286.

Boyce, Jim, "Microsoft Outlook 2010 Inside Out," Aug. 1, 2010, retrieved from the internet https://capdtron.files.wordpress.com/2013/01/outlook-2010-inside_out.pdf.

Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.

(56) References Cited

OTHER PUBLICATIONS

Canese et al., "Chapter 2: PubMed: The Bibliographic Database," The NCBI Handbook, Oct. 2002, pp. 1-10.
Capptain—Pilot Your Apps, http://www.capptain.com Printed Jul. 18, 2013 in 6 pages.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.
Cohn et al., "Semi-supervised Clustering with User Feedback," Constrained Clustering: Advances in Algorithms, Theory, and Applications 4.1, 2003, pp. 17-32.
Conner, Nancy, "Google Apps: The Missing Manual," May 1, 2008, pp. 15.
Countly Mobile Analytics, http://count.ly/ Printed Jul. 18, 2013 in 9 pages.
Definition "Identify" downloaded Jan. 22, 2015, 1 page.
Definition "Overlay" downloaded Jan. 22, 2015, 1 page.
Delcher et al., "Identifying Bacterial Genes and Endosymbiont DNA with Glimmer," BioInformatics, vol. 23, No. 6, 2007, pp. 673-679.
Distimo—App Analytics, http://www.distimo.com/app-analytics Printed Jul. 18, 2013 in 5 pages.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
Flurry Analytics, http://www.flurry.com/ Printed Jul. 18, 2013 in 14 pages.
Gis-Net 3 Public—Department of Regional Planning. Planning & Zoning Information for Unincorporated LA County. Retrieved Oct. 2, 2013 from http://gis.planning.lacounty.gov/GIS-NET3_Public/Viewer.html.
Google Analytics Official Website—Web Analytics & Reporting, http://www.google.com/analytics.index.html Printed Jul. 18, 2013 in 22 pages.
Gorr et al., "Crime Hot Spot Forecasting: Modeling and Comparative Evaluation," Grant 98-IJ-CX-K005, May 6, 2002, 37 pages.
Goswami, Gautam, "Quite Writly Said!," One Brick at a Time, Aug. 21, 2005, pp. 7.
Griffith, Daniel A., "A Generalized Huff Model," Geographical Analysis, Apr. 1982, vol. 14, No. 2, pp. 135-144.
Gu et al., "Record Linkage: Current Practice and Future Directions," Jan. 15, 2004, pp. 32.
Hansen et al. "Analyzing Social Media Networks with NodeXL: Insights from a Connected World", Chapter 4, pp. 53-67 and Chapter 10, pp. 143-164, published Sep. 2010.
Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.
Hibbert et al., "Prediction of Shopping Behavior Using a Huff Model Within a GIS Framework," Healthy Eating in Context, Mar. 18, 2011, pp. 16.
Hogue et al., "Thresher: Automating the Unwrapping of Semantic Content from the World Wide Web," 14th International Conference on World Wide Web, WWW 2005: Chiba, Japan, May 10-14, 2005, pp. 86-95.
Hua et al., "A Multi-attribute Data Structure with Parallel Bloom Filters for Network Services" HiPC 2006, LNCS 4297, pp. 277-288, 2006.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
Kahan et al., "Annotea: an open RDF infrastructure for shared WEB annotations", Computer Networks 39, pp. 589-608, 2002.
Keylines.com, "An Introduction to KeyLines and Network Visualization," Mar. 2014, http://keylines.com/wp-content/uploads/2014/03/KeyLines-White-Paper.pdf downloaded May 12, 2014 in 8 pages.
Keylines.com, "KeyLines Datasheet," Mar. 2014, http://keylines.com/wp-content/uploads/2014/03/KeyLines-datasheet.pdf downloaded May 12, 2014 in 2 pages.
Keylines.com, "Visualizing Threats: Improved Cyber Security Through Network Visualization," Apr. 2014, http://keylines.com/wp-content/uploads/2014/04/Visualizing-Threats1.pdf downloaded May 12, 2014 in 10 pages.
Kitts, Paul, "Chapter 14: Genome Assembly and Annotation Process," The NCBI Handbook, Oct. 2002, pp. 1-21.
Kontagent Mobile Analytics, http://www.kontagent.com/ Printed Jul. 18, 2013 in 9 pages.
Li et al., "Interactive Multimodal Visual Search on Mobile Device," IEEE Transactions on Multimedia, vol. 15, No. 3, Apr. 1, 2013, pp. 594-607.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Localytics—Mobile App Marketing & Analytics, http://www.localytics.com/ Printed Jul. 18, 2013 in 12 pages.
Madden, Tom, "Chapter 16: The BLAST Sequence Analysis Tool," The NCBI Handbook, Oct. 2002, pp. 1-15.
Manno et al., "Introducing Collaboration in Single-user Applications through the Centralized Control Architecture," 2010, pp. 10.
Manske, "File Saving Dialogs," http://www.mozilla.org/editor/ui_specs/FileSaveDialogs.html, Jan. 20, 1999, pp. 7.
Map of San Jose, CA. Retrieved Oct. 2, 2013 from http://maps.bing.com.
Map of San Jose, CA. Retrieved Oct. 2, 2013 from http://maps.google.com.
Map of San Jose, CA. Retrieved Oct. 2, 2013 from http://maps.yahoo.com.
Microsoft—Developer Network, "Getting Started with VBA in Word 2010," Apr. 2010, http://msdn.microsoft.com/en-us/library/ff604039%28v=office.14%29.aspx as printed Apr. 4, 2014 in 17 pages.
Microsoft Office—Visio, "About connecting shapes," http://office.microsoft.com/en-us/visio-help/about-connecting-shapes-HP085050369.aspx printed Aug. 4, 2011 in 6 pages.
Microsoft Office—Visio, "Add and glue connectors with the Connector tool," http://office.microsoft.com/en-us/visio-help/add-and-glue-connectors-with-the-connector-tool-HA010048532.aspx?CTT=1 printed Aug. 4, 2011 in 1 page.
Mixpanel—Mobile Analytics, https://mixpanel.com/ Printed Jul. 18, 2013 in 13 pages.
Mizrachi, Ilene, "Chapter 1: GenBank: The Nuckeotide Sequence Database," The NCBI Handbook, Oct. 2002, pp. 1-14.
Nierman, "Evaluating Structural Similarity in XML Documents," 2002, 6 pages.
Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.
Open Web Analytics (OWA), http://www.openwebanalytics.com/ Printed Jul. 19, 2013 in 5 pages.
Palmas et al., "An Edge-Bunding Layout for Interactive Parallel Coordinates" 2014 IEEE Pacific Visualization Symposium, pp. 57-64.

(56) References Cited

OTHER PUBLICATIONS

Piwik—Free Web Analytics Software. http://piwik.org/ Printed Jul. 19, 2013 in18 pages.
"Potential Money Laundering Warning Signs," snapshot taken 2003, https://web.archive.org/web/20030816090055/http://finsolinc.com/ANTI-MONEY%20LAUNDERING %20TRAINING%20GUIDE.pdf.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
Rouse, Margaret, "OLAP Cube," http://searchdatamanagement.techtarget.com/definition/OLAP-cube, Apr. 28, 2012, pp. 16.
Sigrist, et al., "Prosite, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
StatCounter—Free Invisible Web Tracker, Hit Counter and Web Stats, http://statcounter.com/ Printed Jul. 19, 2013 in 17 pages.
TestFlight—Beta Testing on The Fly, http://testflightapp.com/ Printed Jul. 18, 2013 in 3 pages.
"The FASTA Program Package," fasta-36.3.4, Mar. 25, 2011, pp. 29.
Thompson, Mick, "Getting Started with GEO," Getting Started with GEO, Jul. 26, 2011.
trak.io, http://trak.io/ printed Jul. 18, 2013 in 3 pages.
Umagandhi et al., "Search Query Recommendations Using Hybrid User Profile with Query Logs," International Journal of Computer Applications, vol. 80, No. 10, Oct. 1, 2013, pp. 7-18.
UserMetrix, http://usermetrix.com/android-analytics printed Jul. 18, 2013 in 3 pages.
Valentini et al., "Ensembles of Learning Machines," M. Marinaro and R. Tagliaferri (Eds.): WIRN VIETRI 2002, LNCS 2486, pp. 3-20.
Vose et al., "Help File for ModelRisk Version 5," 2007, Vose Software, pp. 349-353. [Uploaded in 2 Parts].
Wang et al., "Research on a Clustering Data De-Duplication Mechanism Based on Bloom Filter," IEEE 2010, 5 pages.
Wikipedia, "Federated Database System," Sep. 7, 2013, retrieved from the internet on Jan. 27, 2015 http://en.wikipedia.org/w/index.php?title=Federated_database_system&oldid=571954221.
Yang et al., "HTML Page Analysis Based on Visual Cues," 2001, pp. 859-864.
Official Communication for Australian Patent Application No. 2014201511 dated Feb. 27, 2015.
Official Communication for Australian Patent Application No. 2014202442 dated Mar. 19, 2015.
Official Communication for Australian Patent Application No. 2014210604 dated Jun. 5, 2015.
Official Communication for Australian Patent Application No. 2014210614 dated Jun. 5, 2015.
Official Communication for Australian Patent Application No. 2014213553 dated May 7, 2015.
Official Communication for Australian Patent Application No. 2014250678 dated Jun. 17, 2015.
Official Communication for European Patent Application No. 14158861.6 dated Jun. 16, 2014.
Official Communication for European Patent Application No. 14159464.8 dated Jul. 31, 2014.
Official Communication for European Patent Application No. 14180142.3 dated Feb. 6, 2015.
Official Communication for European Patent Application No. 14180281.9 dated Jan. 26, 2015.
Official Communication for European Patent Application No. 14180321.3 dated Apr. 17, 2015.
Official Communication for European Patent Application No. 14180432.8 dated Jun. 23, 2015.
Official Communication for European Patent Application No. 14186225.0 dated Feb. 13, 2015.
Official Communication for European Patent Application No. 14187739.9 dated Jul. 6, 2015.
Official Communication for European Patent Application No. 14187996.5 dated Feb. 12, 2015.
Official Communication for European Patent Application No. 14189344.6 dated Feb. 20, 2015.
Official Communication for European Patent Application No. 14189347.9 dated Mar. 4, 2015.
Official Communication for European Patent Application No. 14189802.3 dated May 11, 2015.
Official Communication for European Patent Application No. 14191540.5 dated May 27, 2015.
Official Communication for European Patent Application No. 14197879.1 dated Apr. 28, 2015.
Official Communication for European Patent Application No. 14197895.7 dated Apr. 28, 2015.
Official Communication for European Patent Application No. 14199182.8 dated Mar. 13, 2015.
Official Communication for European Patent Application No. 14200298.9 dated May 13, 2015.
Official Communication for Great Britain Patent Application No. 1404457.2 dated Aug. 14, 2014.
Official Communication for Great Britain Patent Application No. 1404486.1 dated May 21, 2015.
Official Communication for Great Britain Patent Application No. 1404486.1 dated Aug. 27, 2014.
Official Communication for Great Britain Patent Application No. 1404489.5 dated May 21, 2015.
Official Communication for Great Britain Patent Application No. 1404489.5 dated Aug. 27, 2014.
Official Communication for Great Britain Patent Application No. 1404499.4 dated Jun. 11, 2015.
Official Communication for Great Britain Patent Application No. 1404499.4 dated Aug. 20, 2014.
Official Communication for Great Britain Patent Application No. 1404574.4 dated Dec. 18, 2014.
Official Communication for Great Britain Patent Application No. 1408025.3 dated Nov. 6, 2014.
Official Communication for Great Britain Patent Application No. 1411984.6 dated Dec. 22, 2014.
Official Communication for Great Britain Patent Application No. 1413935.6 dated Jan. 27, 2015.
Official Communication for Netherlands Patent Application No. 2013306 dated Apr. 24, 2015.
Official Communication for New Zealand Patent Application No. 622473 dated Jun. 19, 2014.
Official Communication for New Zealand Patent Application No. 622473 dated Mar. 27, 2014.
Official Communication for New Zealand Patent Application No. 622513 dated Apr. 3, 2014.
Official Communication for New Zealand Patent Application No. 622517 dated Apr. 3, 2014.
Official Communication for New Zealand Patent Application No. 624557 dated May 14, 2014.
Official Communication for New Zealand Patent Application No. 627962 dated Aug. 5, 2014.
Official Communication for New Zealand Patent Application No. 628161 dated Aug. 25, 2014.
Official Communication for New Zealand Patent Application No. 628263 dated Aug. 12, 2014.
Official Communication for New Zealand Patent Application No. 628495 dated Aug. 19, 2014.
Official Communication for New Zealand Patent Application No. 628585 dated Aug. 26, 2014.
Official Communication for New Zealand Patent Application No. 628840 dated Aug. 28, 2014.
Official Communication for U.S. Appl. No. 12/556,318 dated Jul. 2, 2015.
Official Communication for U.S. Appl. No. 13/247,987 dated Apr. 2, 2015.
Official Communication for U.S. Appl. No. 13/827,491 dated Dec. 1, 2014.

(56) References Cited

OTHER PUBLICATIONS

Official Communication for U.S. Appl. No. 13/831,791 dated Mar. 4, 2015.
Official Communication for U.S. Appl. No. 13/831,791 dated Aug. 6, 2015.
Official Communication for U.S. Appl. No. 13/835,688 dated Jun. 17, 2015.
Official Communication for U.S. Appl. No. 13/839,026 dated Aug. 4, 2015.
Notice of Allowance for U.S. Appl. No. 14/102,394 dated Aug. 25, 2014.
Notice of Allowance for U.S. Appl. No. 14/108,187 dated Aug. 29, 2014.
Notice of Allowance for U.S. Appl. No. 14/135,289 dated Oct. 14, 2014.
Official Communication for U.S. Appl. No. 14/148,568 dated Oct. 22, 2014.
Official Communication for U.S. Appl. No. 14/148,568 dated Mar. 26, 2015.
Notice of Allowance for U.S. Appl. No. 14/192,767 dated Dec. 16, 2014.
Official Communication for U.S. Appl. No. 14/196,814 dated May 5, 2015.
Official Communication for U.S. Appl. No. 14/225,006 dated Sep. 10, 2014.
Official Communication for U.S. Appl. No. 14/225,006 dated Sep. 2, 2015.
Official Communication for U.S. Appl. No. 14/225,006 dated Feb. 27, 2015.
Official Communication for U.S. Appl. No. 14/225,084 dated Sep. 2, 2014.
Official Communication for U.S. Appl. No. 14/225,084 dated Feb. 20, 2015.
Notice of Allowance for U.S. Appl. No. 14/225,084 dated May 4, 2015.
Official Communication for U.S. Appl. No. 14/225,160 dated Feb. 11, 2015.
Official Communication for U.S. Appl. No. 14/225,160 dated Aug. 12, 2015.
Official Communication for U.S. Appl. No. 14/225,160 dated May 20, 2015.
Official Communication for U.S. Appl. No. 14/225,160 dated Oct. 22, 2014.
Official Communication for U.S. Appl. No. 14/225,160 dated Jul. 29, 2014.
Official Communication for U.S. Appl. No. 14/268,964 dated Sep. 3, 2014.
Notice of Allowance for U.S. Appl. No. 14/268,964 dated Dec. 3, 2014.
Official Communication for U.S. Appl. No. 14/289,596 dated Jul. 18, 2014.
Official Communication for U.S. Appl. No. 14/289,596 dated Jan. 26, 2015.
Official Communication for U.S. Appl. No. 14/289,596 dated Apr. 30, 2015.
Official Communication for U.S. Appl. No. 14/289,599 dated Jul. 22, 2014.
Official Communication for U.S. Appl. No. 14/289,599 dated May 29, 2015.
Official Communication for U.S. Appl. No. 14/294,098 dated Aug. 15, 2014.
Official Communication for U.S. Appl. No. 14/294,098 dated Nov. 6, 2014.
Notice of Allowance for U.S. Appl. No. 14/294,098 dated Dec. 29, 2014.
Official Communication for U.S. Appl. No. 14/306,138 dated Feb. 18, 2015.
Official Communication for U.S. Appl. No. 14/306,138 dated Sep. 23, 2014.
Official Communication for U.S. Appl. No. 14/306,138 dated May 26, 2015.
Official Communication for U.S. Appl. No. 14/306,147 dated Feb. 19, 2015.
Official Communication for U.S. Appl. No. 14/306,147 dated Aug. 7, 2015.
Official Communication for U.S. Appl. No. 14/306,147 dated Sep. 9, 2014.
Official Communication for U.S. Appl. No. 14/306,154 dated Mar. 11, 2015.
Official Communication for U.S. Appl. No. 14/306,154 dated May 15, 2015.
Official Communication for U.S. Appl. No. 14/306,154 dated Jul. 6, 2015.
Official Communication for U.S. Appl. No. 14/306,154 dated Sep. 9, 2014.
Official Communication for U.S. Appl. No. 14/319,161 dated Jan. 23, 2015.
Notice of Allowance for U.S. Appl. No. 14/319,161 dated May 4, 2015.
Official Communication for U.S. Appl. No. 14/319,765 dated Jun. 16, 2015.
Official Communication for U.S. Appl. No. 14/319,765 dated Nov. 25, 2014.
Official Communication for U.S. Appl. No. 14/319,765 dated Feb. 4, 2015.
Official Communication for U.S. Appl. No. 14/323,935 dated Jun. 22, 2015.
Official Communication for U.S. Appl. No. 14/323,935 dated Nov. 28, 2014.
Official Communication for U.S. Appl. No. 14/323,935 dated Mar. 31, 2015.
Official Communication for U.S. Appl. No. 14/326,738 dated Dec. 2, 2014.
Official Communication for U.S. Appl. No. 14/326,738 dated Jul. 31, 2015.
Official Communication for U.S. Appl. No. 14/326,738 dated Mar. 31, 2015.
Official Communication for U.S. Appl. No. 14/451,221 dated Oct. 21, 2014.
Official Communication for U.S. Appl. No. 14/463,615 dated Sep. 10, 2015.
Official Communication for U.S. Appl. No. 14/463,615 dated Nov. 13, 2014.
Official Communication for U.S. Appl. No. 14/463,615 dated May 21, 2015.
Official Communication for U.S. Appl. No. 14/463,615 dated Jan. 28, 2015.
Official Communication for U.S. Appl. No. 14/473,552 dated Feb. 24, 2015.
Notice of Allowance for U.S. Appl. No. 14/473,552 dated Jul. 24, 2015.
Notice of Allowance for U.S. Appl. No. 14/473,860 dated Jan. 5, 2015.
Official Communication for U.S. Appl. No. 14/479,863 dated Dec. 26, 2014.
Notice of Allowance for U.S. Appl. No. 14/479,863 dated Mar. 31, 2015.
Official Communication for U.S. Appl. No. 14/483,527 dated Jun. 22, 2015.
Official Communication for U.S. Appl. No. 14/483,527 dated Jan. 28, 2015.
Official Communication for U.S. Appl. No. 14/486,991 dated Mar. 10, 2015.
Notice of Allowance for U.S. Appl. No. 14/486,991 dated May 1, 2015.
Official Communication for U.S. Appl. No. 14/504,103 dated Mar. 31, 2015.
Official Communication for U.S. Appl. No. 14/504,103 dated Feb. 5, 2015.
Notice of Allowance for U.S. Appl. No. 14/504,103 dated May 18, 2015.

(56) References Cited

OTHER PUBLICATIONS

Official Communication for U.S. Appl. No. 14/552,336 dated Jul. 20, 2015.
Official Communication for U.S. Appl. No. 14/571,098 dated Mar. 11, 2015.
Official Communication for U.S. Appl. No. 14/571,098 dated Aug. 5, 2015.
Official Communication for U.S. Appl. No. 14/579,752 dated Aug. 19, 2015.
Official Communication for U.S. Appl. No. 14/579,752 dated May 26, 2015.
Notice of Allowance for U.S. Appl. No. 14/616,080 dated Apr. 2, 2015.
Official Communication for U.S. Appl. No. 14/631,633 dated Sep. 10, 2015.
Official Communication for U.S. Appl. No. 14/639,606 dated May 18, 2015.
Official Communication for U.S. Appl. No. 14/639,606 dated Jul. 24, 2015.
Official Communication for U.S. Appl. No. 14/676,621 dated Jul. 30, 2015.
Official Communication for European Patent Application No. 16161182.7 dated Jul. 14, 2016.
Official Communication for European Patent Application No. 16161182.7 dated Aug. 1, 2017.

* cited by examiner

FIG. 3A

302 — Search panel

🔍 XXXXXXXXXXXXXX (CLEAR ALL)

- COMPLEXITY INDEX
- DEPLETION MECHANISM
- DEPOSITIONAL ENVIRONMENT
- DEPTH BELOW MUDLINE
- FACES
- NET PAY
- NG
- OIL API GRAVITY
- PERMUTABILITY
- POROSITY
- PROJECT STATUS
- RECOVERY FACTOR
- RESERVES PER PROCESS
- RESERVOIR DEPTH
- WELL SPACING
- VISCOCITY

304 — FIELDS & RESERVOIRS

- ☐ Field 1 ›
- ☐ Field 2
- ☐ Field 3
- ☐ Field 4
- ☐ Field 5
- ☐ Field 6
- ☐ Field 7
- ☐ Field 8
- ☐ Field 9
- ☐ Field 10
- ☐ Field 11
- ☐ Field 12
- ☐ Field 13
- ☐ Field 14
- ☐ Field 15
- ☐ Field 16
- ☐ Field 17
- ☐ Field 18
- ☐ Field 19

306 — FIELD 1 (Log out)

FIELD INFO
- Country — U.S.
- Operator — Oil Co.

STRUCTURE
- Aquifer Strength — 3-Moderate
- Depositional Environment — Fluvial/Deltaic
- Depth Below Mudline — 2787m
- Net Pay — 10m
- Permeability — 64md
- Reservoir Depth — 2915m
- Rock Type — Shale
- Tree — Dry

FLUIDS
- Oil API Gravity — 34
- Viscosity — 0.407cp

DEVELOPMENT
- Depletion Mechanism — Waterflood
- Production Status — Mature
- Recovery Factor — Oil Current 25.6%

| Title | Aquifer Strength | Complexity Index | Complexity, Depositional, Lateral Continuity | Complexity, Depositional, Stacking | Complexity, Depositional, Vertical Continuity | Complexity, Energy, Aquifer | Complexity, Energy, Compaction | Complexity, Energy, Gas Cap | Complexity, Energy, Pressure | Complexity, Fluids, Formation Water | Complexity, Fluids, HC Column Height | Complexity, Fluids, Hydrocarbon Quality |
|---|---|---|---|---|---|---|---|---|---|---|---|---|
| Field 1 | | 60.4 | 2 | 1 | 2 | 3 | 4 | 1 | 1 | 3 | 1 | 2.1 |
| Field 3 | | 47.9 | 2 | 2.5 | 2.5 | 4 | 4 | 1 | 11 | 1 | 1 | 2.2 |
| Field 5 | | 47.4 | 2 | 1 | 1 | 4 | 4 | 1 | 2 | 4 | 1 | 2.2 |
| Field 7 | 3-moderate | 53.2 | 2 | 3 | 2 | 1 | 4 | 1 | 4 | 2 | 3 | 1.8 |

FIG. 3E

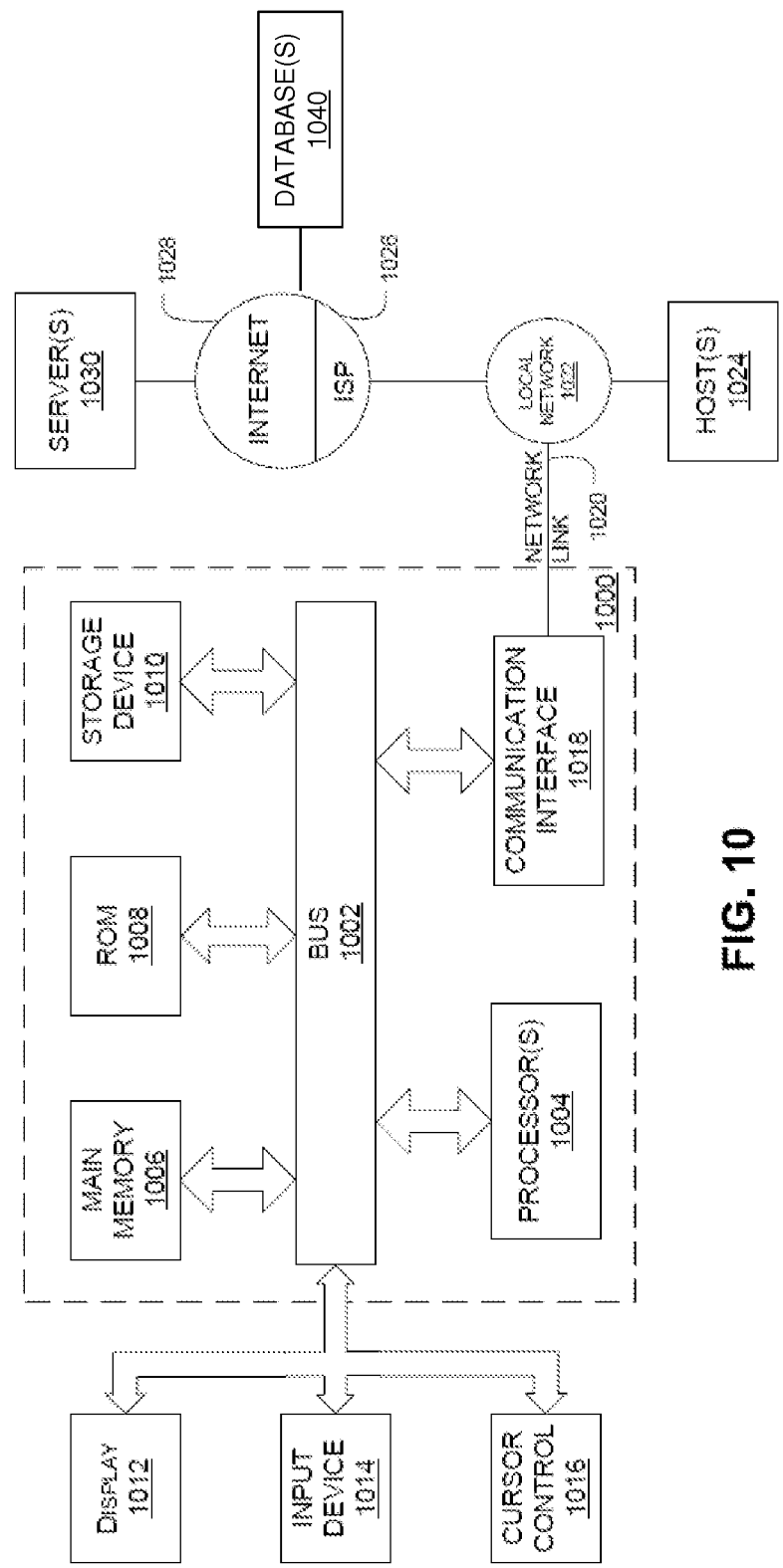

SYSTEM AND METHOD FOR COMPARING AND VISUALIZING DATA ENTITIES AND DATA ENTITY SERIES

PRIORITY AND INCORPORATION BY REFERENCE

This application claims the priority and benefit of U.S. Provisional No. 62/135,456, filed Mar. 19, 2015, which is hereby incorporated by reference in its entirety. Any and all applications for which a foreign or domestic priority claim is identified in the Application Data Sheet as filed with the present application are hereby incorporated by reference under 37 CFR 1.57.

TECHNICAL FIELD

The present disclosure relates to systems and techniques for querying databases and displaying queried data in an interactive user interface.

BACKGROUND

A database may store a large quantity of data. For example, a system may comprise a large number of sensors that each collect measurements at regular intervals, and the measurements may be stored in the database. The measurement data can be supplemented with other data, such as information regarding events that occurred while the system was operational, and the supplemental data can also be stored in the database.

In some cases, a user may attempt to analyze a portion of the stored data. For example, the user may attempt to identify and analyze a portion of the stored data associated with one or more devices, such as data from multiple sensors associated with a geological formation, such as an oil well. However, as the number of measurements increases over time, it can become very difficult for the user to identify the relevant data and perform the analysis.

SUMMARY

In one embodiment, a computerized system enables accessing one or more databases in substantially real-time to create and use a workflow template for analyzing data entities stored in the one or more databases. A workflow may be performed to generate one or more charts or visualizations based upon a received selection of one or more series, data sources, and entities, and wherein data source is used to determine values of a series for a particular entity. A workflow template for a particular workflow may be used by a user to perform the workflow without having to specify the restrictions and/or configuration settings associated with the workflow each time the workflow is performed. Thus, the template allows the workflow to be performed without the user having to be familiar with the restrictions and configuration settings associated with the workflow.

In some embodiments, after a desired workflow is identified, one or more series, data source, and/or entity restrictions based upon the workflow are defined based at least in part upon one or more user inputs. In addition, one or more chart or visualization configuration settings based upon the workflow may also be defined. The restrictions and configuration options are saved as the workflow template. The workflow may then be performed by loading the saved workflow template, and based upon the defined restrictions of the saved template, receiving a selection of one or more series, data sources, and entities. One or more charts or visualizations may then be automatically generated and displayed based upon the defined configuration options of the saved template.

BRIEF DESCRIPTION OF THE DRAWINGS

FIGS. 3A-E illustrates user interfaces that may be used by a user to view and analyze the entities stored in the database, in accordance in some embodiments.

FIG. 10 illustrates a computer system with which certain methods discussed herein may be implemented, according to one embodiment.

DETAILED DESCRIPTION

Overview

Figure 1:
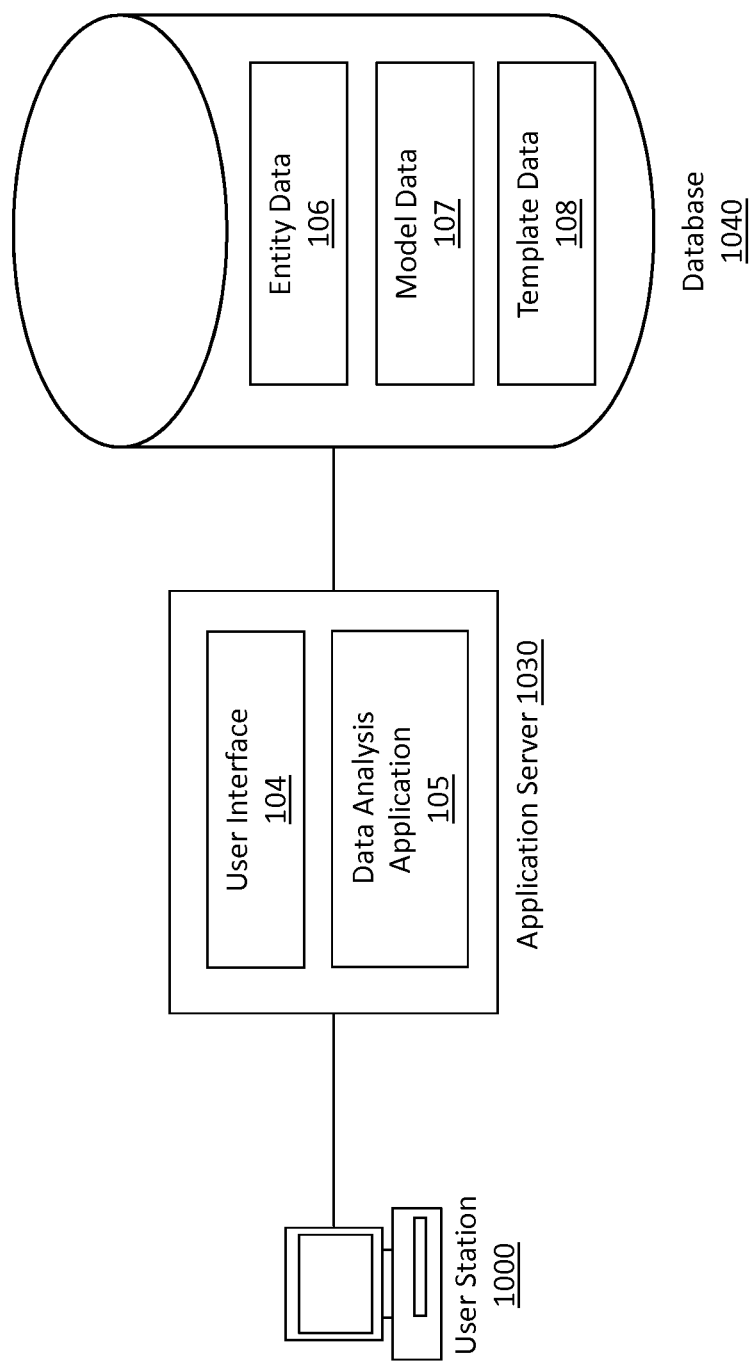
FIG. 1 illustrates a system that may be used to implement data entity analysis, in accordance with some embodiments.

As described above, it can become very difficult for the user to identify relevant data and perform an analysis when a database includes a large amount of data. In some cases, the database may contain data from a plurality of sensors at least of a plurality of entities, such as geological formations, that are of interest to the user. The data may also include historical data relating to attributes of the entities (e.g., measurements collected by one or more sensors associated with the entity over time), and/or models generated to predict or forecast attributes of the entity.

For example, in some embodiments, a database may contain data relating to a plurality of geological formations or structures related to the drilling of oil, such as regions, fields, reservoirs, and/or wells. This data may be used by a user (e.g., a surveyor or analyst) to determine which regions, fields, reservoirs, and/or wells to develop or invest in, to analyze historical data, and/or to construct models to forecast future performance. As used herein, a "data entity" or "entity" describes any object or system for which data may be provided, such as from sensors. Example data entities include individual oil wells, groups of oil wells, oil platforms, geographic regions, reservoirs, fields, etc. Data entities may include other objects or systems unrelated to oil well development, such as electronic devices, landfills, robotics, mechanical systems, etc.

For example, the user may identify an entity corresponding to a particular geological formation (e.g., a potential reservoir), and assess the entity for one or more attributes or characteristics (e.g., suitability for future development and/or investment). In order to assess the selected entity, the entity may be compared with other entities (e.g., other reservoirs) having similar attributes or characteristics. In addition, in some embodiments, in response to a user selecting a baseline data entity (e.g., another oil reservoir or modeled oil reservoir), the system may rank a plurality of data entities based upon similarity to the baseline data entity, allowing the user to select and analyze the most relevant data entities.

In some embodiments, the user may also wish to view attribute time series for various fields, reservoirs, and/or other data entities, such as to compare performance of models with collected historical data, compare different models, and/or the like. In some embodiments, the user may select one or more series, data sources, and entities for chart creation, and specify chart configuration options controlling how the charts are to be displayed. In some embodiments, a template may be constructed based upon a selected chart creation workflow, allowing a user to perform the workflow without having to re-specify the configuration parameters associated with the workflow.

Accordingly, disclosed herein are various systems and methods for analyzing data entities and visualizing data entity series. While the present disclosure will refer primarily to the use case of analyzing oil fields/reservoirs, the systems and methods disclosed herein may be applied to other fields and use cases, such as mining, market research, financial investments, scientific studies, geographical surveys, and/or the like. For example, in other embodiments, entities may correspond to various types of geological structures or formations, markets, financial entities, people, events, and/or the like.

Description of the Figures

FIG. 1 illustrates a system that may be used for data entity analysis in accordance with some embodiments. The system comprises a user station 1000, an application server 1030, and a database 1040, which may communicate directly with each other or over a network (not shown).

The user station 1000 may correspond to any type of computing station that may be used to operate or interface with the applications in the system (e.g., applications on application server 1030). Examples of such user stations include for example, workstations, personal computers, or remote computing terminals. User stations may also include mobile devices, such as smartphones, tablets, or touchscreen devices. The user station 1000 comprises a display device 1012, such as a display monitor, for displaying a user interface to users at the user station. The user station 1000 also comprises one or more input devices 1014 for the user to provide operational control over the activities of the system, such as a mouse, keyboard, or touchscreen to manipulate a graphical user interface to generate user inputs (e.g., by manipulating a cursor or pointing object in the graphical user interface).

Application server 1030 may be used to run one or more modules or applications that can be accessed by a user at user station 1000, such as a user interface module 104 and a data analysis application 105.

Data analysis application 105 may comprise a software application accessible by the user at user station 1000 to perform a variety of operations on received data from database 1040 or another data source. In some embodiments, data analysis application 105 may be a web application that is accessed by the user at user station 1000 through an internet or web browser, such as Internet Explorer, Mozilla Firefox, or Google Chrome. Data analysis application 105 may contain data analysis tools to be used by the user to identify and select data entities for analysis and comparison, based upon data received from database 1040 and/or other data sources. For example, the user may select data entities based upon one or more filters based upon data entity attributes, and/or identify data entities that are similar to a baseline data entity. Data analysis application 105 may also contain chart creation tools to be used by the user to create one or more charts, graphs, and/or other visualizations based upon received data from database 1040 and/or other data sources.

User interface module 104 may comprise a module configured to generate a user interface that may be viewed and interacted with by a user at user station 1000, allowing the user to use the tools and modules contained within data analysis application 105.

Database 1040 may contain entity data 106, model data 107, and template data 108. Entity data 106 comprises data related to a plurality of data entities which, as described above, may correspond to any object or system for which data may be provided, such as from sensors. In some embodiments, entity data 106 may also comprise historical data associated with the data entities. Model data 107 may comprise one or more models. In some embodiments, models may be constructed and used to predict or forecast attributes associated with a data entity. Template data 108 may comprise one or more workflow templates. In some embodiments, workflow templates constructed based upon a selected workflow, allowing a user to perform the workflow without having to re-specify the configuration parameters associated with the workflow.

The database 1040 may be a Relational Database Management System (RDBMS) that stores the data as rows in relational tables. The term "database," as used herein, may refer to an database (e.g., RDBMS or SQL database), or may refer to any other data structure, such as, for example a comma separated values (CSV), extensible markup language (XML), text (TXT) file, flat file, spreadsheet file, and/or any other widely used or proprietary format. While the database 1040 is shown as a distinct computing system, the database 1040 may operate on the same computing system as the application server 1030 and/or user station 1000. In some embodiments, database 1040 may correspond to multiple databases, and/or span multiple servers or computing devices.

In some embodiments, the data analysis application 105 may be used to allow a user to filter entities based upon attribute values, and compare the filtered entities. For example, entities may correspond to fields or reservoirs used in the oil or gas industries. A potential or prospective reservoir may be identified as a candidate for development or investment by an oil company. However, because investment in a new field or reservoir can be extremely expensive, often costing tens to hundreds of millions of dollars, it is important to be able to learn more about the potential field or reservoir, so that the investment may be made with confidence. One of the primary ways to learn about a new potential field or reservoir is to compare the field or reservoir with other fields or reservoirs that have similar characteristics. By examining other fields/reservoirs with similar characteristics that have been previously invested in, a more informed decision can be made as to whether to invest in the new potential field/reservoir. As noted above, although oil fields/reservoirs are used for purpose of example, these functions may be applied to use cases in a variety of other areas, such as market research, insurance investigations, financial investments, scientific studies, and/or the like.

Figure 2:
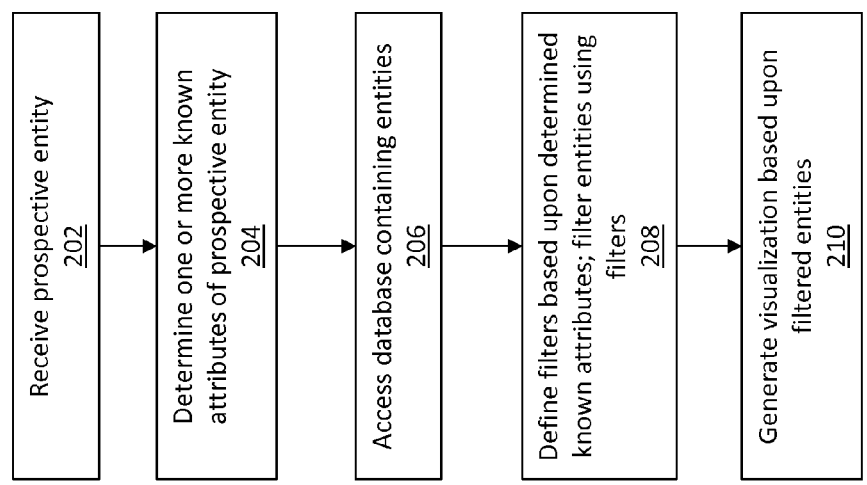
FIG. 2 illustrates a flowchart of a process for comparing a potential entity with similar entities, in accordance with some embodiments.

FIG. 2 is a flowchart of a process for comparing a potential entity with similar entities, in accordance with some embodiments. In some embodiments, the process may be executed using the system illustrated in FIG. 1, such as by the user station 101 and/or the application server 102. Depending on the embodiment, the method of FIG. 2 may include fewer or additional blocks and/or the blocks may be performed in an order different than is illustrated.

At block 202, an entity for analysis is received, such as via a user input in a user interface provided to the user station 101. In some embodiments, the entity corresponds to a prospective or potential entity, such as a potential field or reservoir that an oil company is considering investing in or developing, a potential market that a manufacturer is considering entering, and/or the like.

At block 204, one or more attributes of the received entity are identified. For example, attributes of an entity corresponding to a potential reservoir may include reservoir depth, depositional environment, depletion mechanism, porosity, location, and/or the like. In some embodiments, the identified attributes are attributes that may be determined at relatively low cost.

At block 206, a database storing data regarding a plurality of entities is accessed. At block 208, one or more filters are provided by the user, such as via a user interface provided to the user station 101. In some embodiments, one or more of the filters may correspond directly to attribute value ranges, maximums, or minimums of the entity. For example, if the entity corresponding to a potential reservoir has a location attribute value of "United States," a filter may be defined that filters for reservoirs also having a location attribute value of "United States." In some embodiments, one or more of the filters may correspond to a range or category that encompasses or includes an attribute value of the entity. For example, if the potential reservoir has a depth of 1200 m, a filter may be defined that filters for reservoirs having a depth attribute value of between 1000 m and 1500 m. In some embodiments, one or more of the filters may correspond to values related to attribute value of the entity. For example, a filter may be defined that filters for reservoirs having a location attribute value that is located near the location value of the prospective reservoir.

In some embodiments, the filters may be determined automatically, or be based at least in part upon one or more user inputs. Once the filters are defined based upon the identified attributes of the prospective entity, the database entities may be filtered using the defined filters, in order to form one or more filtered entities.

Figure 3B:
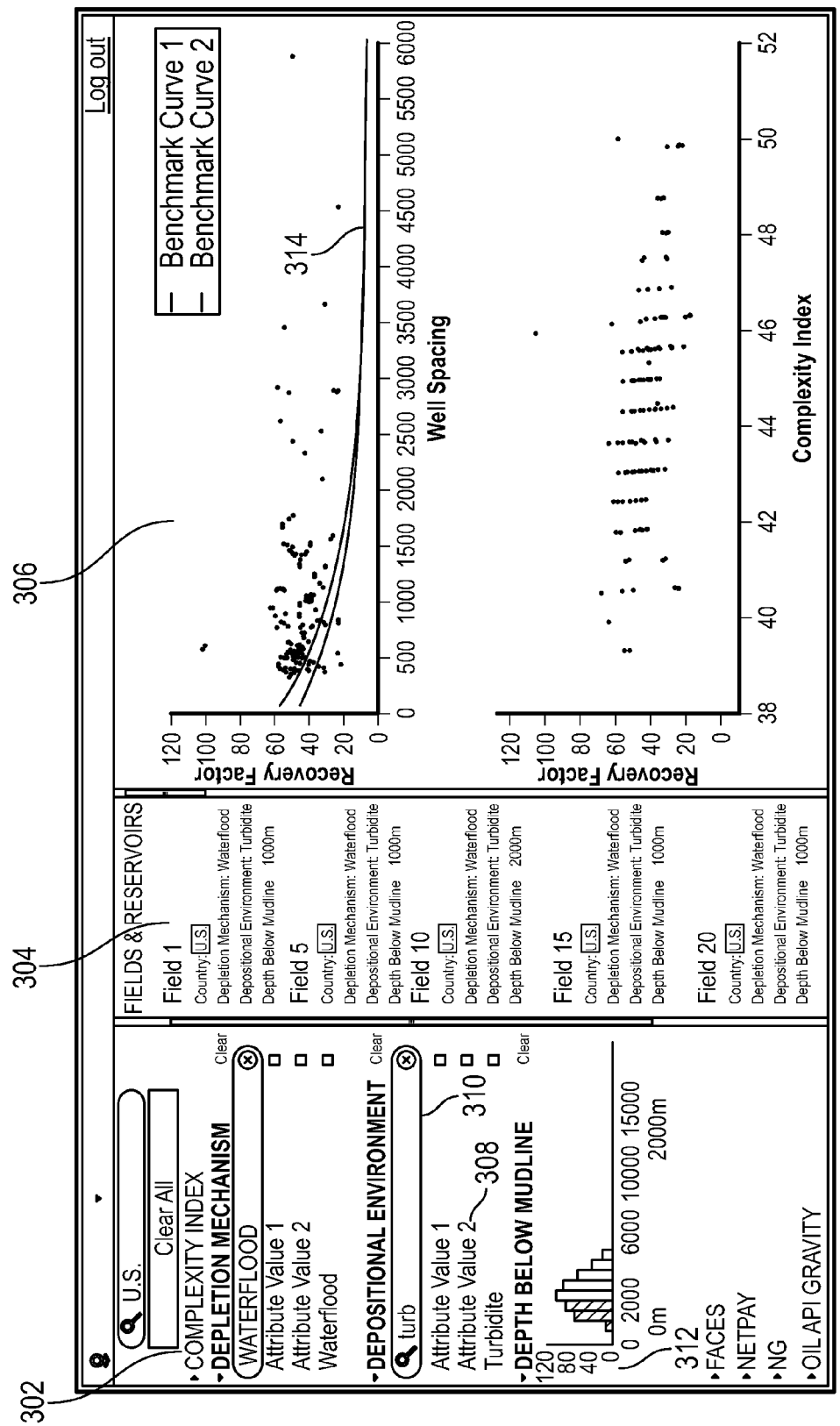

FIG. 3A-E illustrates user interfaces that may be used by a user to view and analyze data associated with entities stored in the database, in accordance with some embodiments. In the illustrated interfaces, the entities and attribute types shown relate to oil fields and reservoirs. For example, as illustrated in FIG. 3A, the interface may contain a plurality of columns or display panels. For example, column 302 of the interface contains a list of entity attribute types (e.g., attribute types pertaining to oil fields and reservoirs, while column 304 of the interface contains a list of entities (e.g., oil fields and reservoirs), and column 306 of the interface contains information for a specific selected entity (e.g., a specific oil field or reservoir).

As illustrated in FIG. 3B, a user may use the attribute types shown in panel 302 to define filters to be used to filter the entities. For example, a user may specify a location filter ("U.S."), a depletion mechanism filter ("waterflood"), a "depositional environment" filter ("turbidite"), and a "depth below mudline" filter (0-2000 m).

In some embodiments, when a user clicks on an attribute type (e.g., depositional environment), a drop-down menu 308 or other interface feature may appear that displays available attribute values that may be selected to be used as a filter. In some embodiments, the search box 310 may be displayed that allows the user to search the available attribute values. In some embodiments, a user may be able to select multiple values of an attribute to filter. For example, if the prospective reservoir has a location attribute of "France," the user may click on a location attribute and select "France," "Germany" (a neighboring country of France), and/or another location value.

In some embodiments, for attribute types that correspond to range filters (such as a "depth" attribute), when a user clicks on the attribute type, a visualization 312 such as a graph (e.g., a bar chart) may be displayed that shows a distribution of entities in the databases between the different ranges. One or more user controls may be displayed allowing the user to specify a range to be filtered. In some embodiments, as the user specifies a range, the graph may be visually updated to reflect the selected range (e.g., bars falling within the specified range are shaded). When the user has defined one or more filters at 302, entities that satisfy the filter conditions may be displayed in column 304.

Returning to FIG. 2, at block 210, one or more visualizations may be generated based upon the entities that satisfy the filters. For example, as illustrated in FIG. 3B, one or more visualizations may be displayed in display area 314. For example, the visualizations may include one or more graphs, such as a scatter plot. In some embodiments, the entity attributes to be used in generating the graphs may be preconfigured, or may be specified by a user. In some embodiments, the graphs may include one or more additional interface elements. For example, a benchmark curve 314 may be displayed that indicates desirable combinations of attributes, such that data points in the graph that fall on one side of the benchmark curve are considered to have a desirable attribute combination, while data points on the other side of the curve are considered to have an undesirable attribute combination.

In some embodiments, other types of visualizations, such as a comparison table comparing one or more attributes of the filtered entities, may be displayed.

Figure 3C:
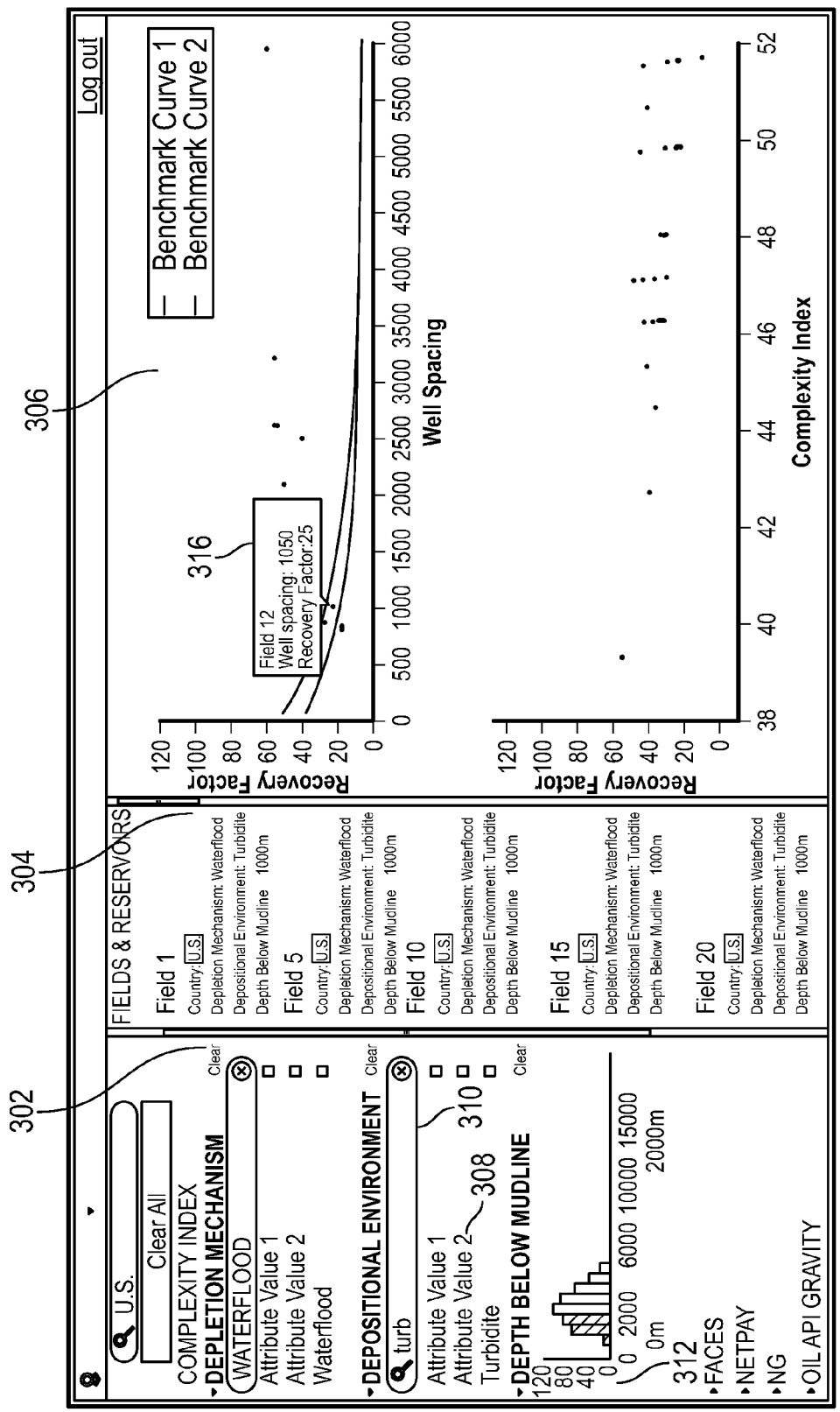

In some embodiments, as illustrated in FIG. 3C, data points on visualization panel 310 may be selected or clicked on. For example, a user may wish to further analyze one or more particular entities, such as an entity below a benchmark curve in order to find out why that entity is below the benchmark. In some embodiments, clicking on a data point corresponding to an entity may cause a text box 316 or other interface element to be displayed, which may contain the name of the entity, as well as information pertaining to the entity (e.g., the plotted attribute values of the entity). In addition, an action may be performed in response to a click on a displayed text box 316, such as selecting the entity in column 304, and/or displaying a full information page for the selected entity (e.g., as illustrated in display area 306 in FIG. 3A).

Figure 3D:
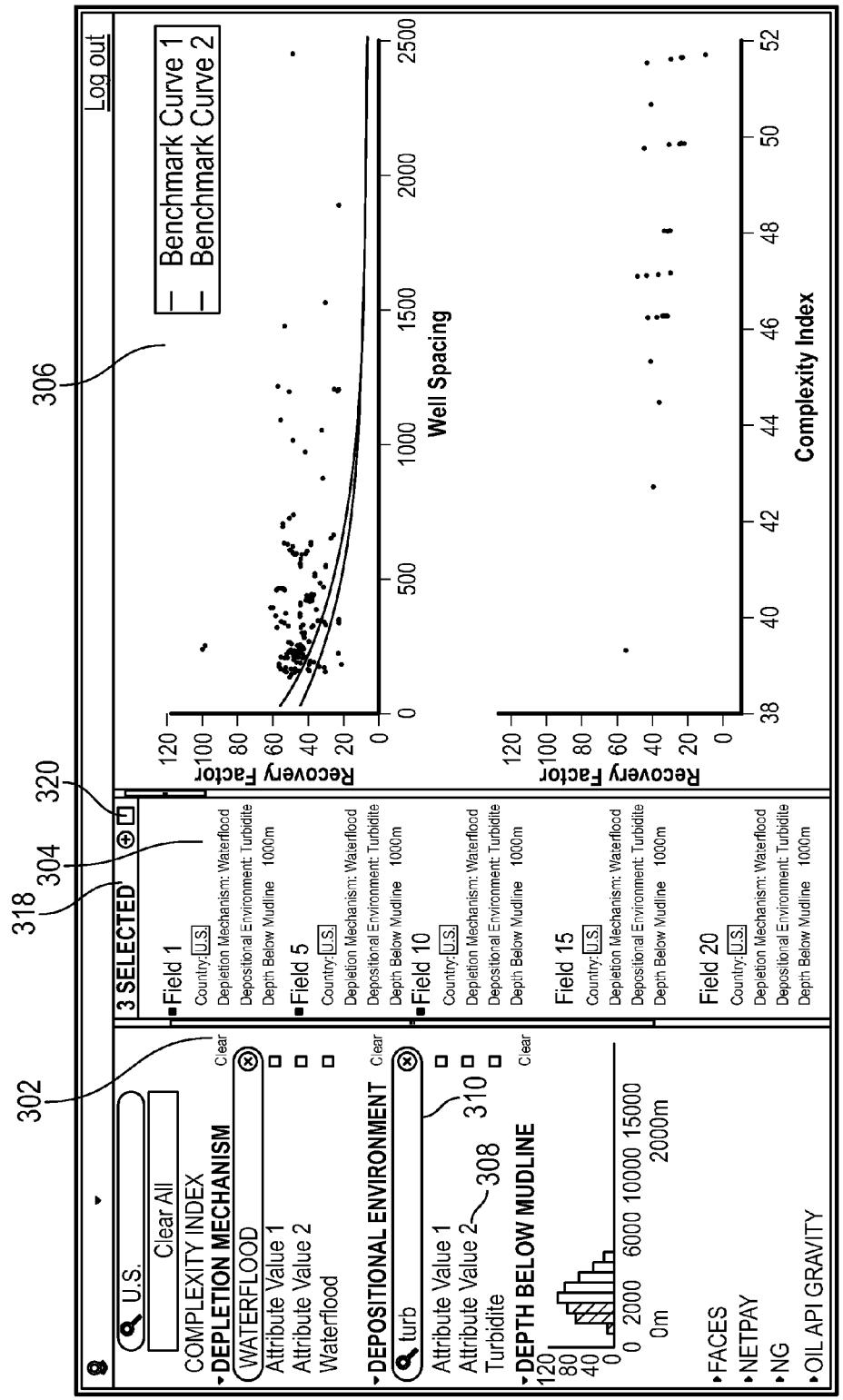

As illustrated in FIG. 3D, one or more entities in column 304 may be selected. When one or more entities have been selected, a toolbar 318 may be displayed indicating that entities have been selected. The toolbar 318 may contain one or more interface elements (e.g., buttons) corresponding to actions that may be taken on the selected entities. For example, by clicking on a table button 320, a comparison table is generated using the selected entities. In addition, in some embodiments, a visualization displayed at 306 may be updated in response to a selection of entities at 304 (e.g., a graph may be updated to only include the selected entities).

FIG. 3E illustrates a comparison table that may be generated based on data associated with one or more selected entities. The comparison table allows the user to compare multiple attributes of one or more selected entities. For example, through the use of a comparison table, the user may be able to better assess and determine the most relevant attributes for achieving a desired performance.

Baseline Entities

In many instances, a large number of entities may be returned to the user, even after applying one or more filters. While a chart having a large number of data points may be easy to read, a user may wish to more closely examine a smaller number of entities in greater detail. For example, a user may wish to view a comparison table between different entities, so that they can more easily compare a large number of different attributes between the entities. However, some types of visualizations, such as comparison tables, may be difficult to read if the number of entities in the table is too large. Thus, the user may wish to be able to first select the most relevant entities before constructing a table. However, when there are a large number of entities, which entities are the most relevant may be difficult to ascertain.

In order to find and select the most relevant entities, a user may first establish an entity to serve as a comparison baseline. The remaining entities may then be ranked based upon their similarity to the baseline entity, allowing the user to select the entities deemed to be most relevant for more detailed comparison. For example, a baseline entity may correspond to a well or reservoir having desirable attributes. In some embodiments, the baseline entity can correspond to an actual entity (e.g., an existing well/reservoir), or may correspond to a hypothetical entity having hypothetical or user-defined characteristics. In some embodiments, the baseline entity may correspond to a potential or prospective entity (e.g., a potential reservoir being assessed for future development or investment), in order to identify the entities that are most similar to the potential entity.

Figure 4:
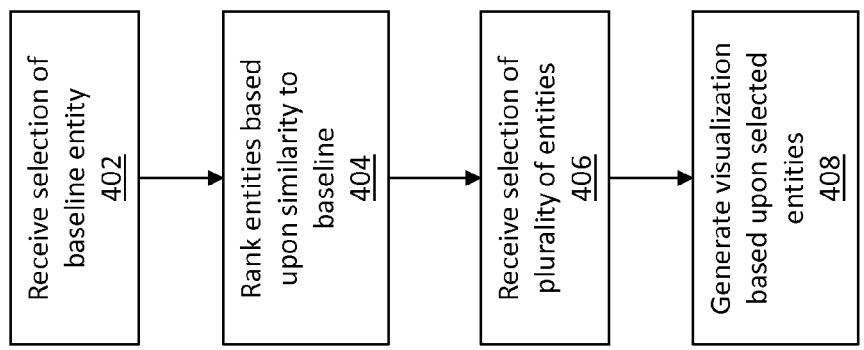
FIG. 4 illustrates a flowchart of a process for defining and using a baseline entity, in accordance with some embodiments.

FIG. 4 illustrates a flowchart of a process for defining and using a baseline entity in accordance with some embodiments. In some embodiments, the process may be executed using the system illustrated in FIG. 1, such as by the user station 1000 and/or the application server 1030. Depending on the embodiment, the method of FIG. 4 may include fewer or additional blocks and/or the blocks may be performed in an order different than is illustrated.

At block 402, a selection of a baseline entity is received. In some embodiments, selecting a baseline entity comprises a user viewing or searching a list of existing entities, and selecting an entity with desirable attributes to serve as a baseline entity. In some embodiments, the baseline entity may be a fictional or hypothetical entity having attributes deemed desirable by the user. In some embodiments, a fictional or hypothetical entity may be created by a user using a user interface to enter one or more attributes. In some embodiments, a user may select more than one existing entity, and a hypothetical baseline entity may be created based upon the plurality of selected entities (e.g., a hypothetical entity with attribute values that are aggregated or averaged from the attribute values of the selected entities).

At block 404, entities are ranked based upon their similarity to the baseline entity. The entities may comprise all available entities in the database, or may be restricted to entities that satisfy one or more filters. In some embodiments, the entities are ranked by calculating a quantity (also may be referred to as a "similarity score") for each entity, based on how similar the entity is to the baseline entity, and then ranking the entities by their similarity scores.

A variety of methods may be used to calculate a similarity score for an entity. For example, in one embodiment, the similarity score between an entity and the baseline entity may be calculated by computing a difference between corresponding attributes of the entity and the baseline entity, and aggregating the differences as a weighted sum. For example, in some embodiments the following formula may be used:

$$\text{Similarity Score} = \sum_{i=1}^{n} w_i |attribute_{i,baseline} - attribute_i|$$

wherein the entity and the baseline entity are compared based upon n attributes, and each attribute is associated with a weight w. In the above formula, $|attribute_{i,baseline} - attribute_i|$ denotes a difference between an attribute value of the baseline entity and the corresponding attribute value of the entity being compared. In some embodiments, this may comprise subtraction for attributes values that can be expressed quantitatively. However, in some embodiments, certain attributes are not expressed quantitatively. In such cases, quantitative scores may be assigned to attribute values based upon whether they are the same or different from the baseline attribute. For example, for a "color" attribute, a score of 0 may be assigned if the color attributes are the same, and a score 1 is assigned if they are different. In some embodiments, quantitative scores may be based at least in part on different degrees of similarity between the attribute value of the baseline entity and those of the entities being ranked (e.g., red and orange may be considered to have a small difference, and have a score of ½, while red and blue may be considered to have a large difference, and have a score of 1).

The above formula is provided for purpose of example, and that in various embodiments, any type of formula or methodology may be used to calculate a similarity score and/or rank the entities based upon a level of similarity or difference from the baseline entity.

At block 406, once the entities have been ranked (e.g., sorted by similarity scores), a selection of one or more entities is received. In some embodiments, this may comprise a user selecting a top n entities from the ranked entities, corresponding to the n entities determined to be most similar to the baseline entity. In some embodiments, the user may specify a desired number of entities and/or a threshold similarity score, whereupon the entities that meet those criteria will be automatically selected.

At block 408, one or more visualizations may be generated based upon the selected entities. For example, the visualization may comprise a comparison table constructed based upon the selected entities (e.g., as illustrated in FIG. 3E).

Figure 5:
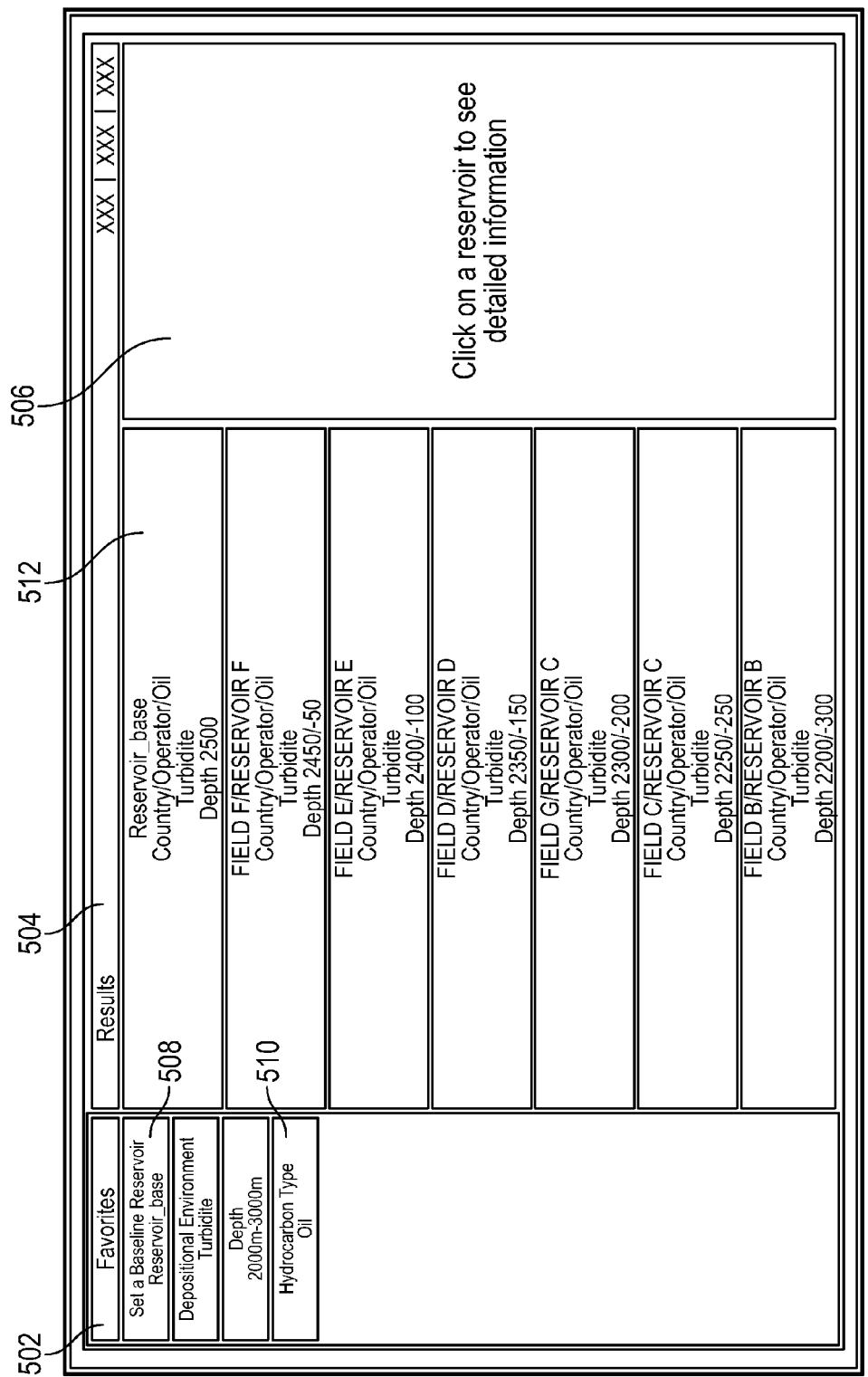
FIG. 5 illustrates an interface that may be used to establish a baseline entity, in accordance with some embodiments.

FIG. 5 illustrates an interface that may be used to establish a baseline entity in accordance with some embodiments. Similar to the interface shown in FIG. 3A, the interface may be divided into a plurality of columns or display areas. The interface may contain a display area 502 that contains a button 508 or other interface element allowing a user to set a baseline entity. For example, upon clicking the button the user may be shown an interface where they may specify a baseline entity (e.g., by selecting an entity from a list of existing entities, defining one or more attributes for a hypothetical baseline entity, and/or the like). Display area 502 may also comprise controls 510 for configuring one or more filters.

If a baseline entity has been selected, it may be displayed at 512 of display area 504. One or more entities may be displayed below the baseline entity, and ranked based upon their similarity to the baseline entity. The displayed entities may correspond to entities that satisfy the one or more filters shown in display area 502.

Display area 506 may be used to display detailed information on a selected entity (e.g., an entity listed in display area 504). In some embodiments, display area 506 may also be used to display visualizations associated with a plurality of entities, such as a chart or a comparison table.

Chart Creation

In some embodiments, entities may be associated with one or more series (may also be referred to as "data series"). In some embodiments, a series may indicate values of an attribute over time or over a particular time period. For example, an entity corresponding to a well or reservoir may be associated with an oil production rate series that plots an oil production rate value in relation to time. In some embodiments, a series associated with an entity may correspond to any attribute of the entity that may be measured over time, such as temperature, price, revenue, and/or the like. For the purposes of the present specification, use of the term "series" may generally refer to a time series that indicates values of a selected attribute of an entity (e.g., temperature, price, revenue, and/or the like) in relation to time. For example, a temperature series may indicate values of a temperature attribute over time. However, in other embodiments, the term "series" may also be used to refer to other types of series that plot attribute values of an entity in relation to an attribute or measurement other than time.

In some embodiments, values of a series for an entity may be determined through one or more different data sources. For example, historical data may be recorded for an entity (e.g., using one or more sensors, monitors, and/or the like) indicating the value of an attribute series at various times in the past. In addition, one or more models may be constructed to model past, present, and/or future values of an attribute series. In some embodiments, the models may be based at least in part upon recorded historical data.

For example, a reservoir entity may be associated with an oil production rate series. The actual oil production rate of the reservoir can be measured over time to produce historical data. In addition, an analyst (and/or automated machine learning software) may construct a model of the reservoir that can be used to compute or predict an oil production rate for the reservoir for any given time. In some embodiments, different models may be constructed based upon assumptions of different conditions. For example, a first model may be constructed that predicts the oil production rate of the reservoir should a new investment of $10 million be received, while a second model may be constructed that predicts the oil production rate with the assumption that no new investment occurs.

A user may wish to be able to generate one or more time series charts based upon series, data sources, and entities. For example, charts may be constructing allowing a user to compare a series over time between different entities, compare a series as determined by different data sources, and/or the like.

Although the present disclosure will refer primarily to time series charts for purposes of example, in other embodiments other types of charts may be constructed. For example, in some embodiments charts may be generated with x-axis attributes other than time. These attributes may include location, temperature, cumulative oil production, cumulative voidage, and/or the like. In some embodiments, charts having an x-axis other than time may be referred to as "cross-plots."

Figure 6:
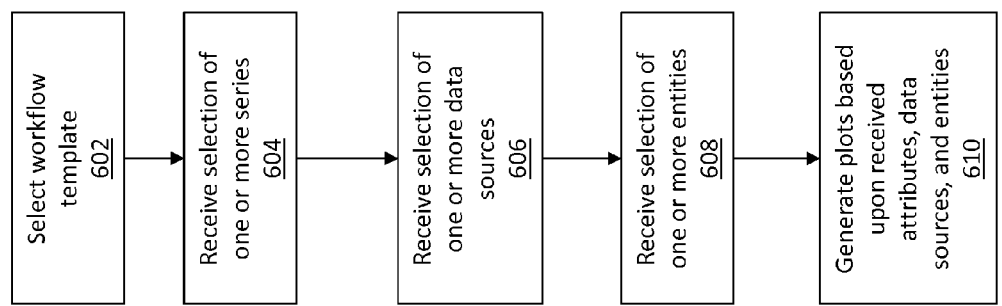
FIG. 6 illustrates a flowchart of a process for generating one or more charts based upon selected series, data sources, and entities, in accordance with some embodiments.

FIG. 6 illustrates a flowchart of a process for generating one or more charts based upon selected series, data sources, and entities, in accordance with some embodiments. In some embodiments, the process may be executed using the system illustrated in FIG. 1, such as by the user station 101 and/or the application server 102. Depending on the embodiment, the method of FIG. 6 may include fewer or additional blocks and/or the blocks may be performed in an order different than is illustrated. FIGS. 7A-I illustrates screens of a chart creation interface that may be presented to a user, in accordance with some embodiments. Description of FIGS. 7A-I is included below alongside discussion of FIG. 6 to illustrate one example of the method.

Figure 7A:
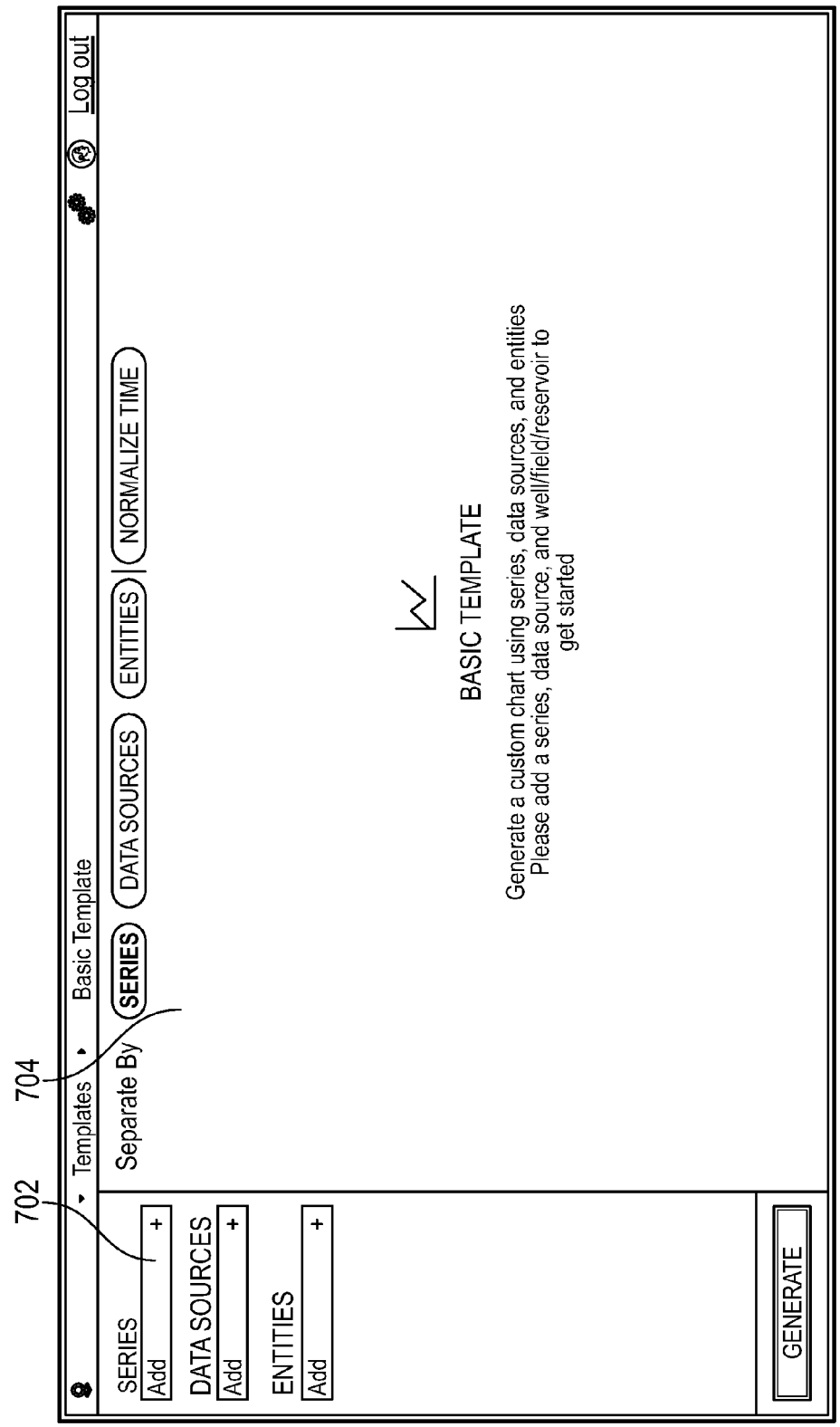
FIGS. 7A-K illustrates a chart creation interface that may be presented to a user, in accordance with some embodiments.

At block 602, a workflow template may be selected. The workflow template may correspond to a commonly performed workflow. In some embodiments, a "basic template" may be available for performing workflows that do not have their own corresponding template. As illustrated in FIG. 7A, the user has selected the "Basic Template." The interface may comprise a plurality of columns or display areas. For example, display area 702 may contain one or more interface elements that can be used by a user to define series, data sources, and/or entities to be used in the creation of one or more charts, which may be displayed in display area 704

Figure 7B:
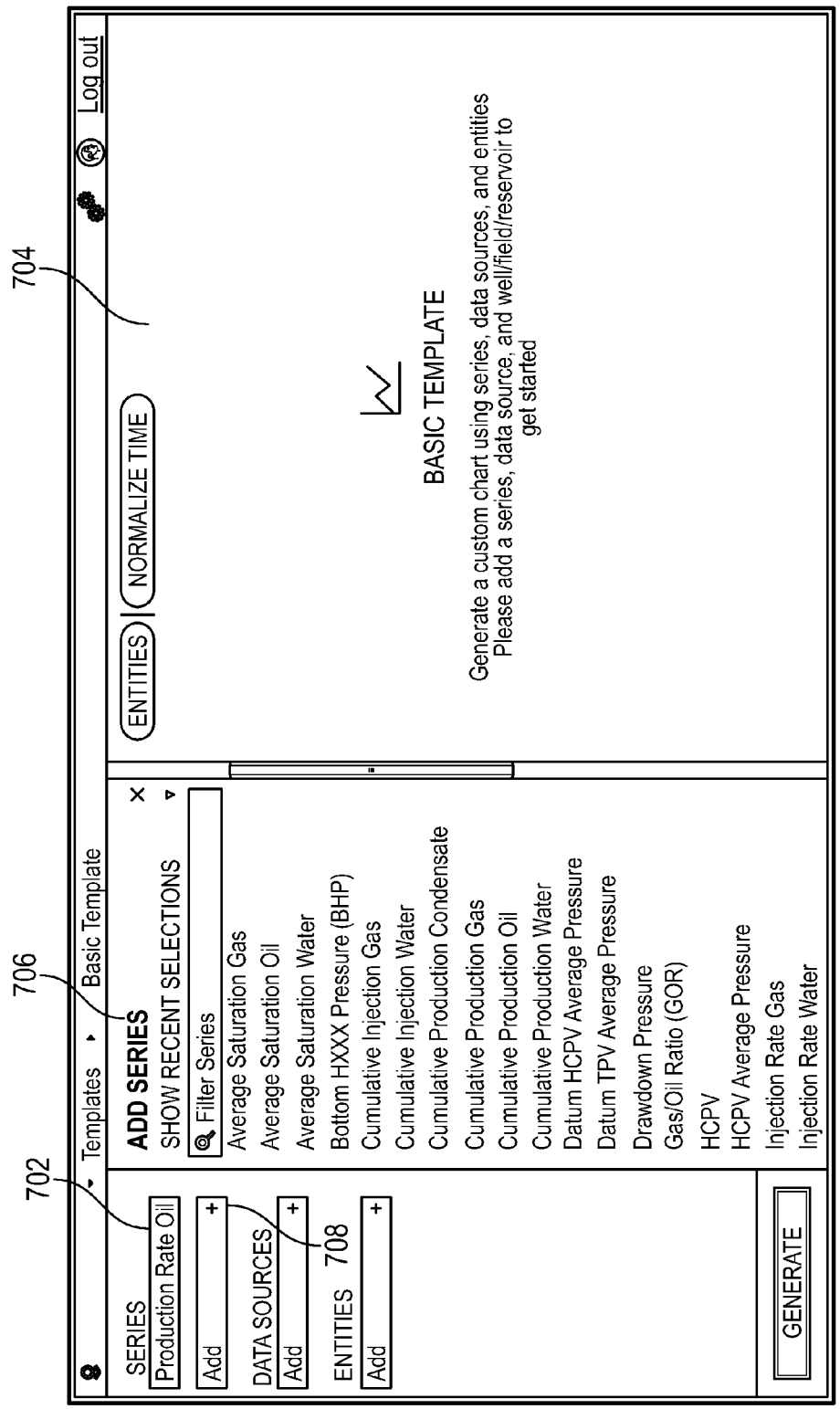

At block 604, a selection of one or more series is received. A series may correspond to any attribute associated with an entity that varies over time, such as oil production rate, gross profits, temperature, rainfall, customer satisfaction, and/or the like. In the context of oil wells and reservoirs, series may correspond to gas, oil, and/or water saturation measures; gas and/or water injection measures (e.g., injection rate, cumulative injection); oil, gas, water, and/or condensate production measures; pressure measures (e.g., drawdown pressure, bottom hole pressure); gas/oil ratio, and/or the like. In some embodiments, a series corresponds to data that may be received as direct readings from a sensor or derived data based on information from one or more sensors. FIG. 7B illustrates an interface where a user may select series to be used in the creation of charts, in accordance with some embodiments. In some embodiments, in response to a user action (e.g., clicking on a button or interface element associated with "Series" in display area 702), a menu 706 or other interface element may be displayed showing series that are available to be selected. In addition, the user may be presented with a search bar allowing the user to search through the displayed attributes. In some embodiments, the interface may contain an interface element such as an "Add" button 708 allowing a user to add additional series for chart creation.

At block 606, a selection of one or more data sources is received. In some embodiments, data sources may comprise historical data. Historical data may be received based upon readings from one or more sensors operating over a period of time. For example, a temperature sensor may be used to generate historical data for a temperature series of a region entity. Historical data may also be received through other means, such as data derived through readings from one or more sensors, periodic observation logs, data retrieved from a database (e.g., price data), and/or the like. Types of sensors that may be used may include temperature sensors, pressure sensors, depth sensors, oil/gas rating sensors (e.g., to measure a quality rating of extracted oil or gas), liquid volume sensors (e.g., to measure a volume of extracted oil), water level sensors, and/or the like.

In addition, data sources may also comprise data computed using one or more models. Models may be constructed by analysts in order to predict future series behavior (e.g., future oil production quantity, future price trends, and/or the like). In some embodiments, models may be based upon previously received historical data. For example, a model may be generated based upon historical pressure or flow rate data for a region entity, in order to predict future pressures or flow rate.

In some embodiments, models may correspond to specific entities. However, models may also be used that can be applied to multiple entities, all entities of a certain type, and/or the like. In some embodiments, models may correspond to specific series, or be able to compute multiple different series.

Figure 7C:
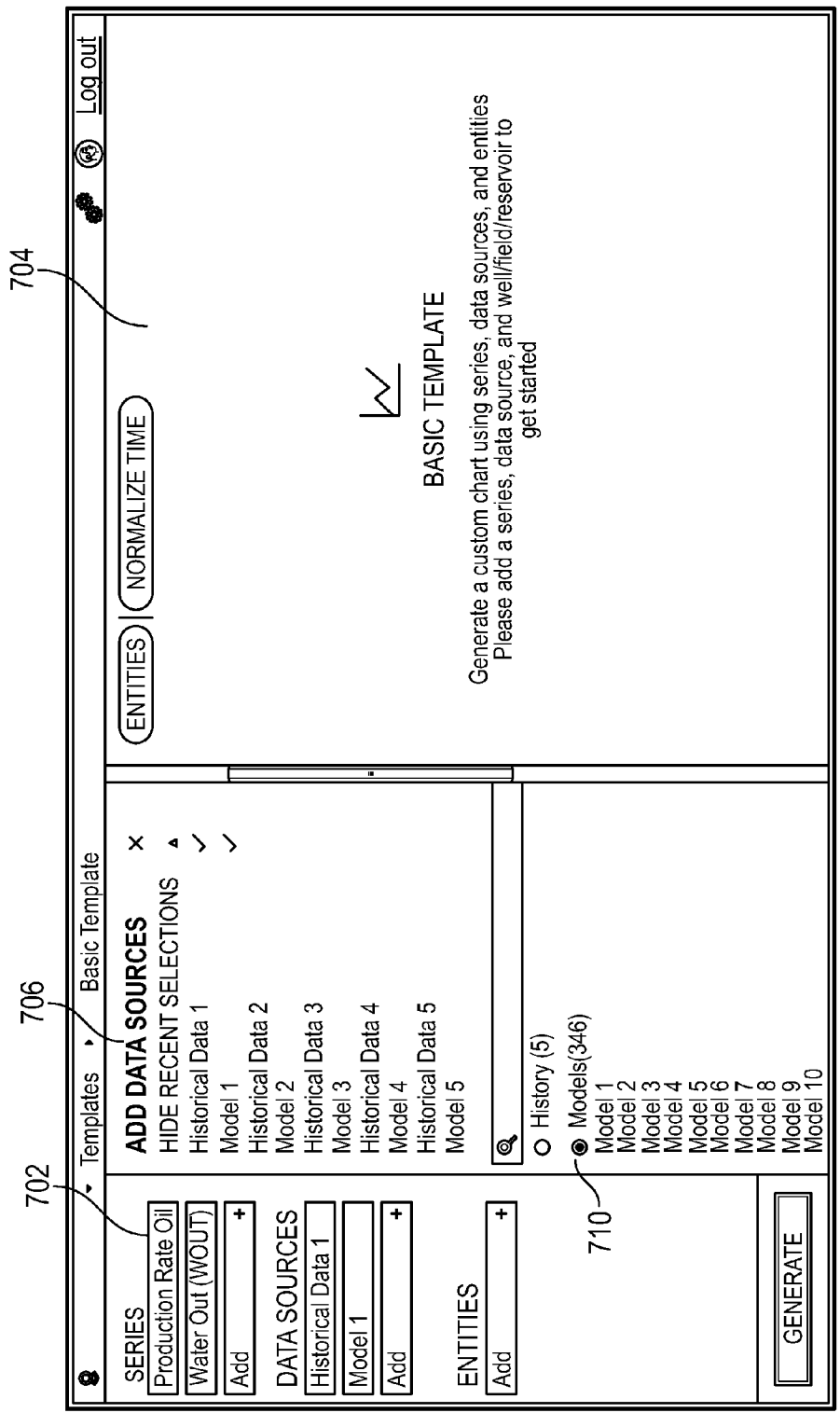

FIG. 7C illustrates an interface where a user may select data sources to be used in the creation of charts, in accordance with some embodiments. Similar to the interface illustrated in FIG. 7A, the user may be presented with a menu showing available data sources that may be selected. In some embodiments, the menu may contain a search bar allowing the user to search through the displayed data sources. The menu may also contain a button or other interface element 710 allowing the user to restrict the displayed data sources to historical data or models. In some embodiments, the displayed models and/or historical data sources may be based at least in part upon the selected series. In some embodiments, the interface may contain an interface element such as an "Add" button allowing a user to add additional data sources for chart creation.

Figure 7D:
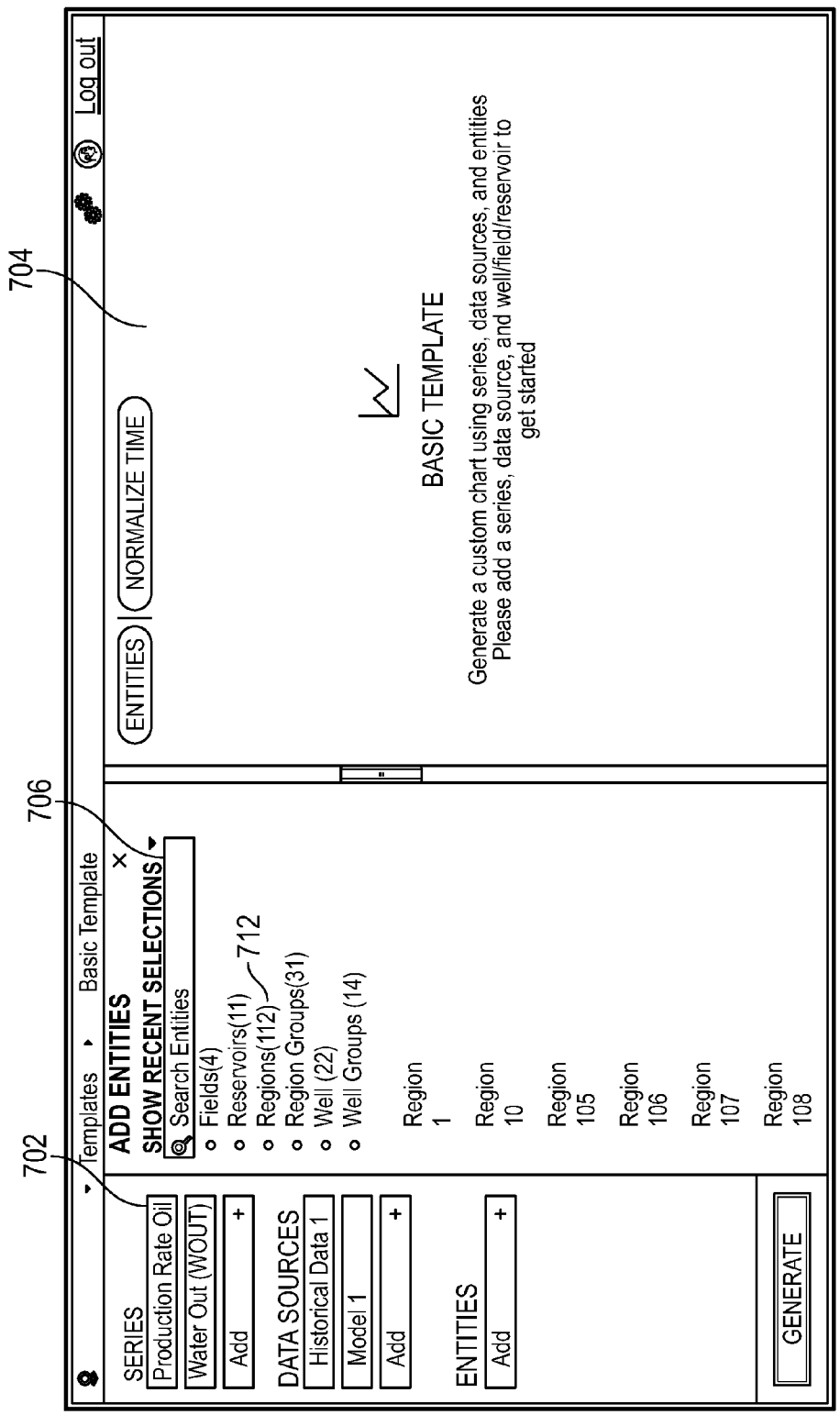

At block 608, a selection of one or more entities may be received. In some embodiments, the one or more entities may correspond to one or more entities selected based upon a prospective entity and/or a baseline entity (e.g., entities similar to the baseline entity). FIG. 7D illustrates an interface where a user may select entities to be used in the creation of charts, in accordance with some embodiments. Similar to interfaces illustrated in FIGS. 7B and 7C, the interface may contain a menu 706 showing available entities that may be selected. In some embodiments, the menu may contain a search bar allowing the user to search through the displayed entities. In some embodiments, the interface may contain an interface element such as an "Add" button allowing a user to add additional entities for chart creation.

In some embodiments, multiple types of entities may be available for selection. For example, in the context of oil production, entities may include fields, reservoirs, regions, region groups, wells, and/or well groups. In some embodiments, some entities may be aggregates of one or more other entities. For example, a region group entity may be an aggregate of a plurality of different region entities, such that a series value for the region group entity (e.g., oil production) may be an aggregate of the corresponding series values of the region entities that comprise it. The menu may contain a button or other interface element 712 allowing the user to restrict the displayed entities to those of a particular type or category.

At block 610, one or more charts are generated based upon the received series, data sources, and entities. In some embodiments, the created charts may be based upon the number of series, data sources, and/or entities selected. For example, in some embodiments, one chart may be created for each series, data source, entity combination. In some embodiments, one or more of these charts may be combined or overlaid on top of each other for easier comparison. An interface may be presented to the user, allowing the user to specify which charts to create and how they are to be combined or overlaid.

In some embodiments, additional charts relating to how the different series, data sources, and entities relate to each other may also be created. For example, a user wishing to compare how two data sources (e.g., two different models) compare may wish to view a graph showing a difference between values of series using one data source, and the values of the series using the other data source. In some embodiments, an interface may be presented to the user allowing them specify what types of additional graphs to create.

Figure 7E:
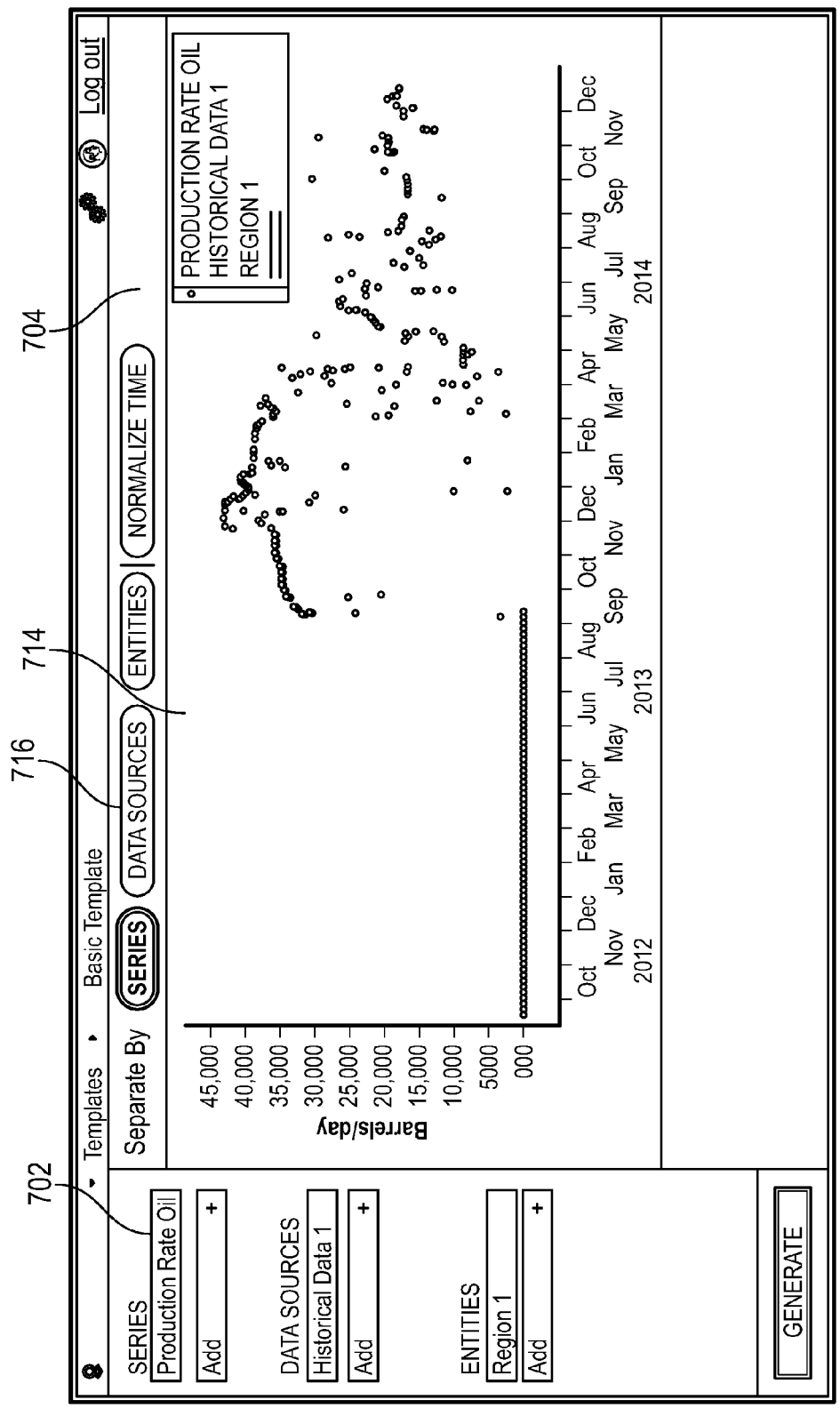

FIG. 7E illustrates an interface containing a chart that may be generated in response to a user selecting a series, data source, and entity. The chart 714 plots values for the series ("Production Rate Oil") corresponding to the selected entity, as determined by the selected data source.

In some embodiments, the interface may contain one or more controls specifying how the charts are to be displayed. For example, the interface may contain one or more controls 716 allow a user to separate the charts based upon series, data source, and/or entity.

Figure 7F:
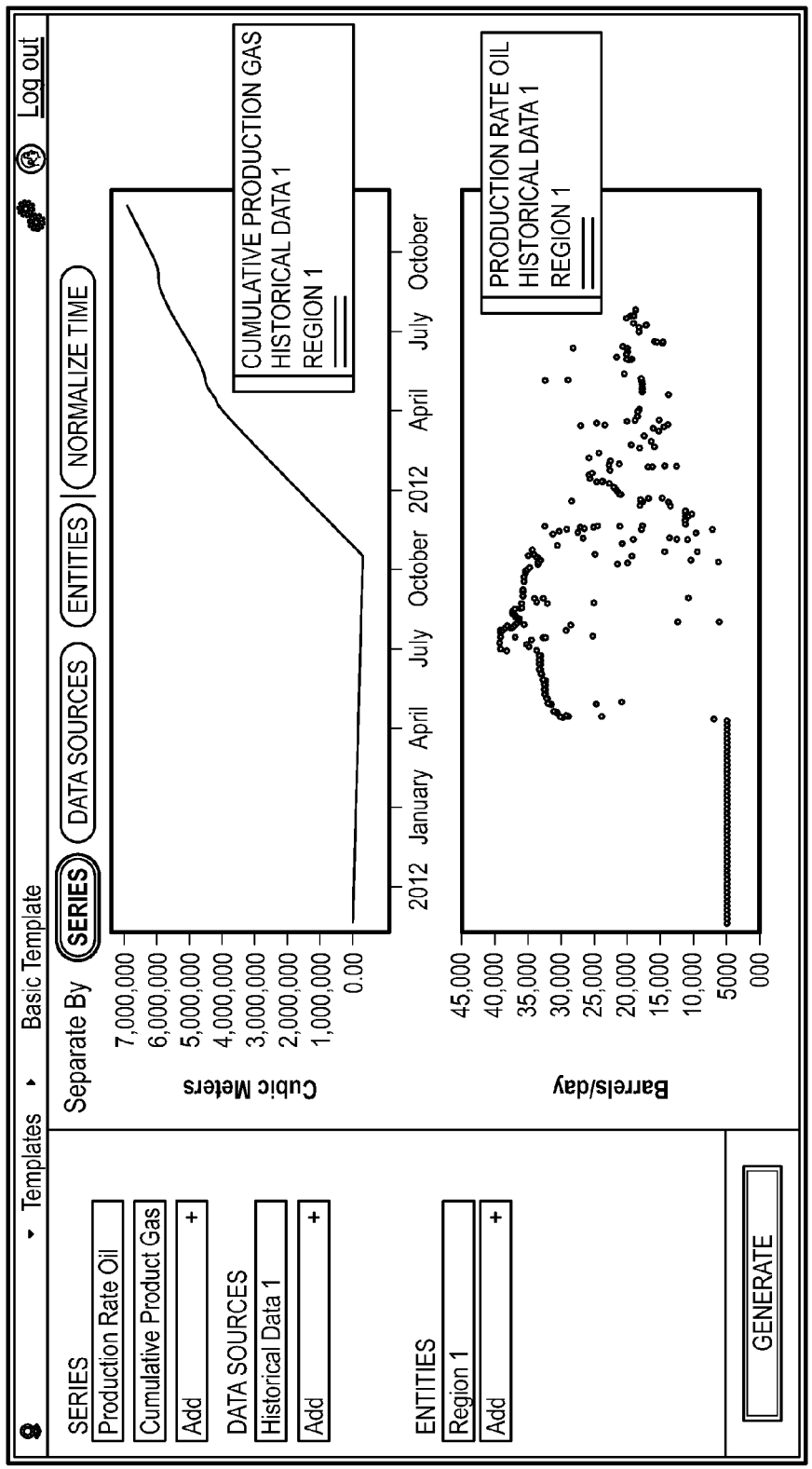

FIG. 7F illustrates an interface where a user has selected two series, one data source, and one entity. In addition, the user has selected to separate the charts by data series. As a result, two charts are produced and displayed, one corresponding to a first selected series ("Cumulative Production Gas"), and another corresponding to a second selected series ("Production Rate Oil").

Figure 7G:
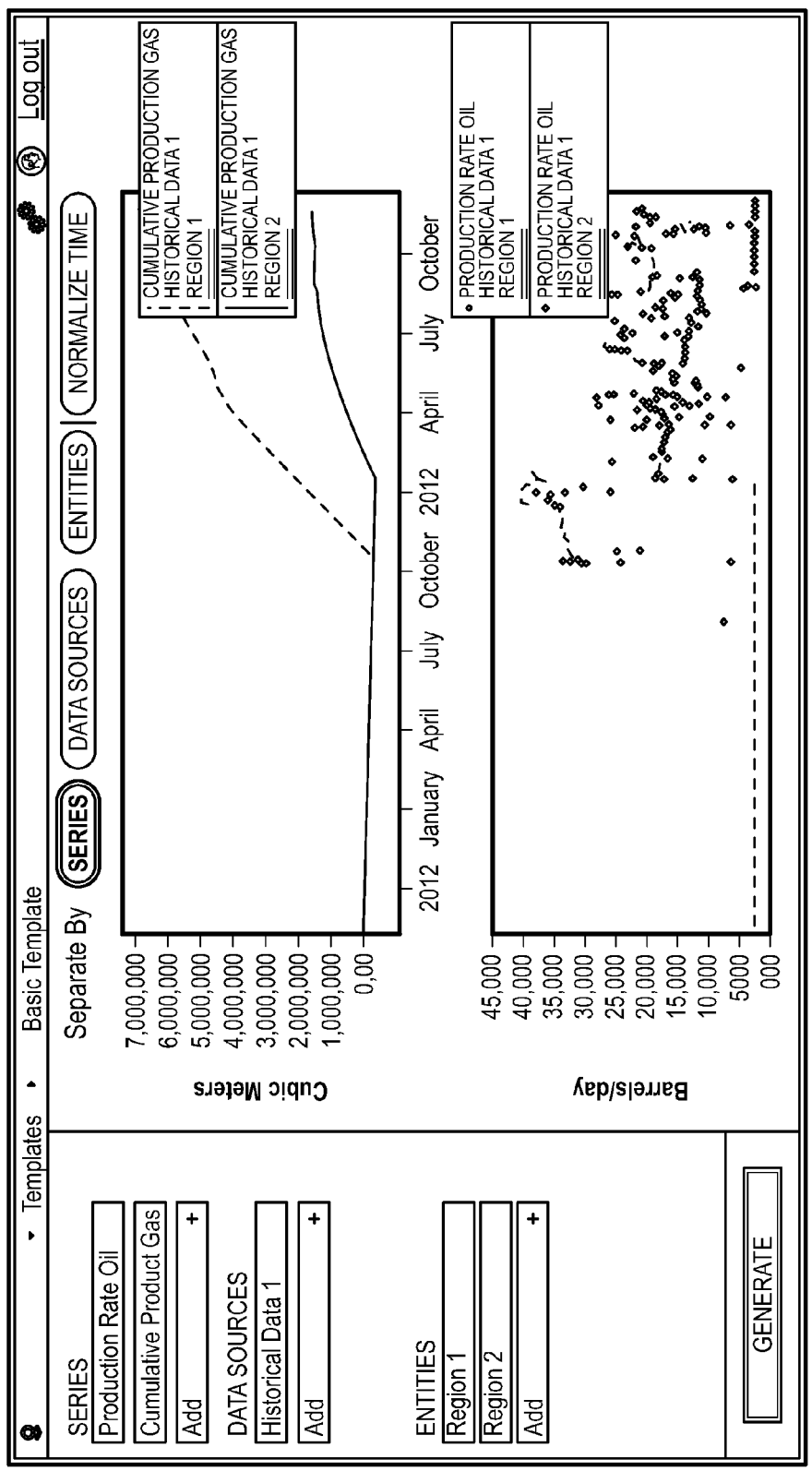

FIG. 7G illustrates an interface where a user has selected two series, one data source, and two entities. In addition, the user has specified that the charts are to be separated by series, resulting in two charts, a first chart showing the "Cumulative Production Gas" series for each of the selected entities, and a second chart showing the "Production Rate Oil" series for each of the selected entities.

Figure 7H:
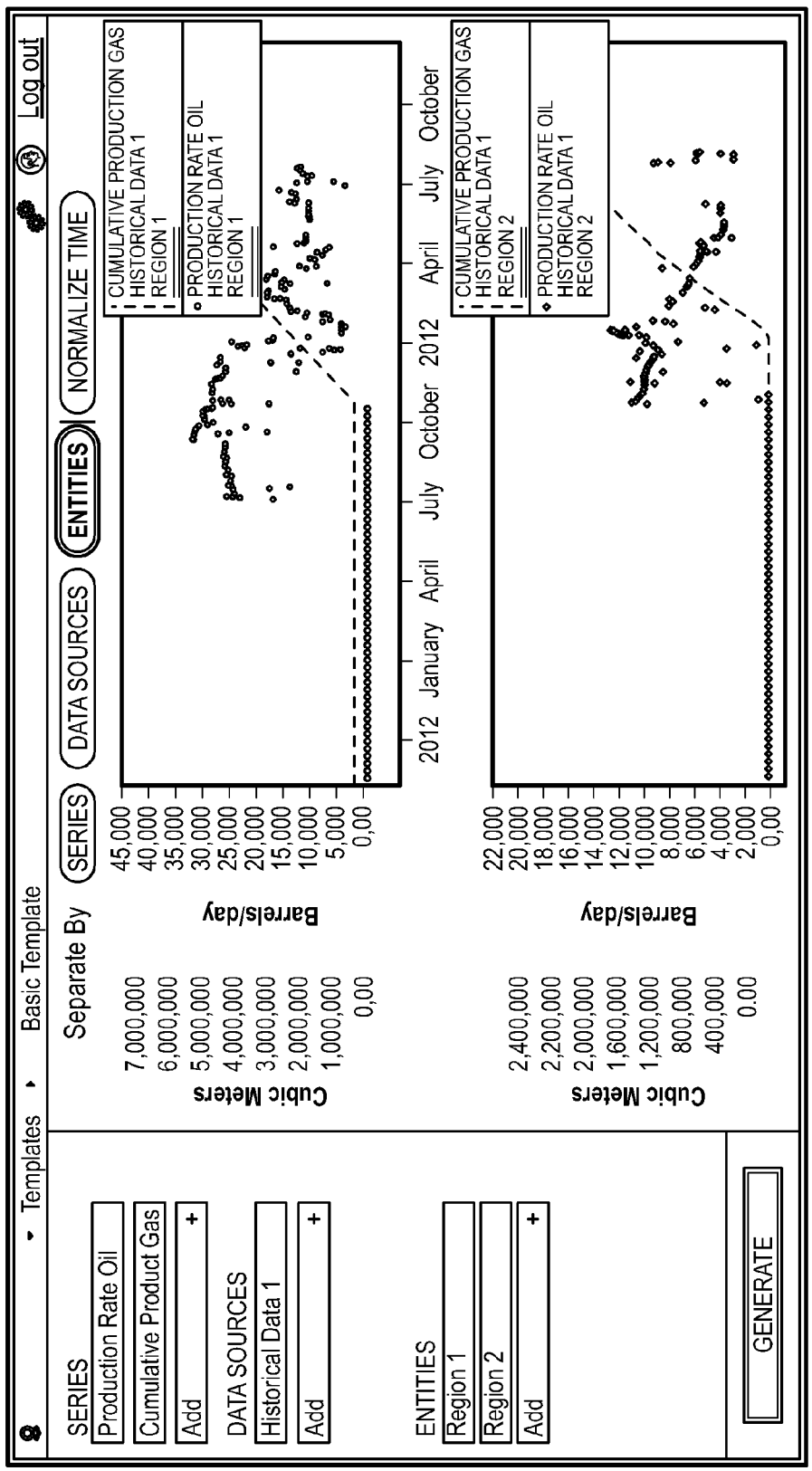

FIG. 7H illustrates an interface where a user has specified that the charts are to be separated by entity. As a result, two charts are produced, which include a first chart corresponding to a first selected entity, and a second chart corresponding to a second selected entity, wherein in each chart the "Cumulative Production Gas" series and "Production Rate Oil" series are overlaid on top of each other.

Figure 7I:
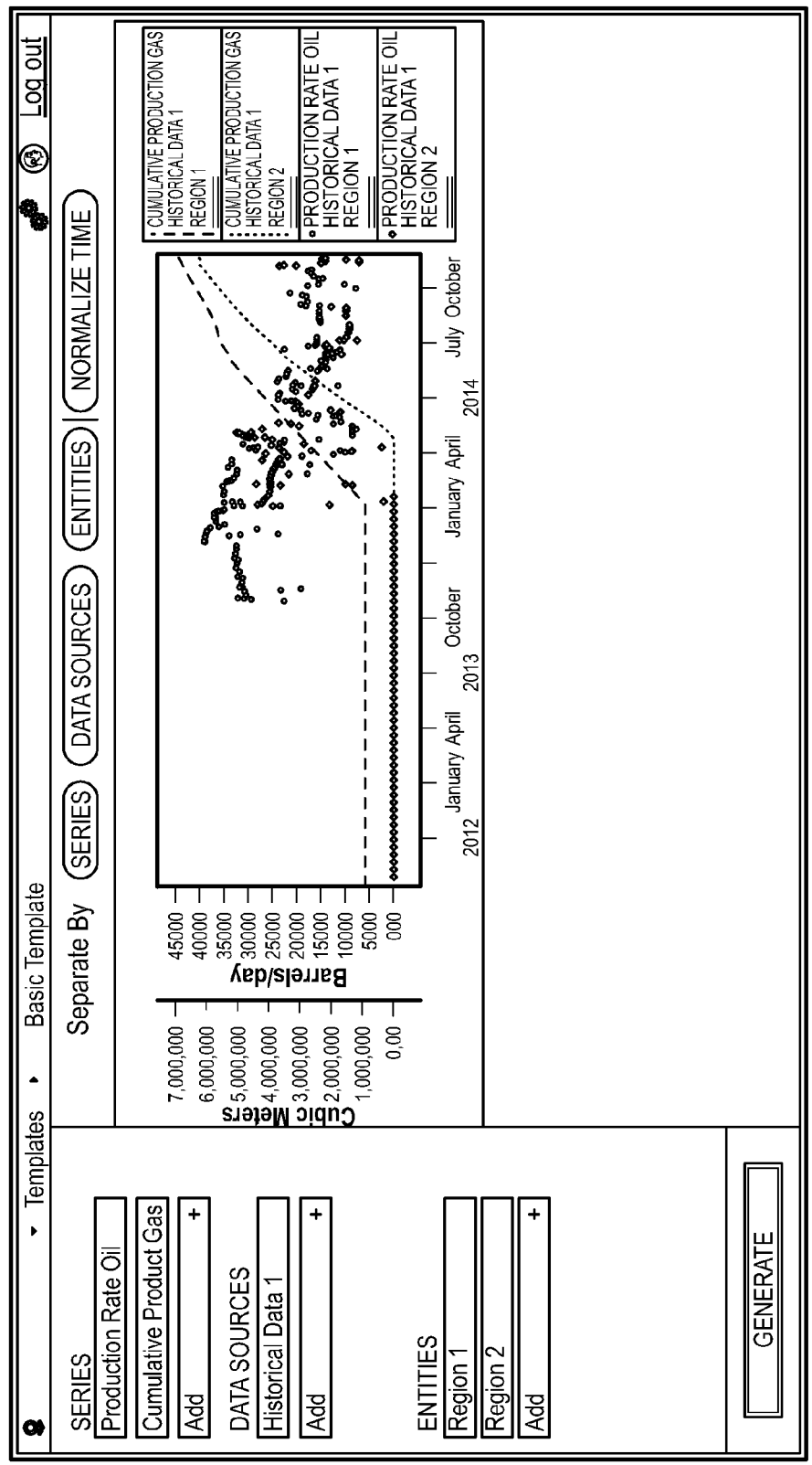

FIG. 7I illustrates an interface where a user has chosen to not separate the charts by series, data source, or entity. As a result, only a single chart has been displayed, showing the two series for each of the two selected entities all overlaid on each other.

Figure 7J:
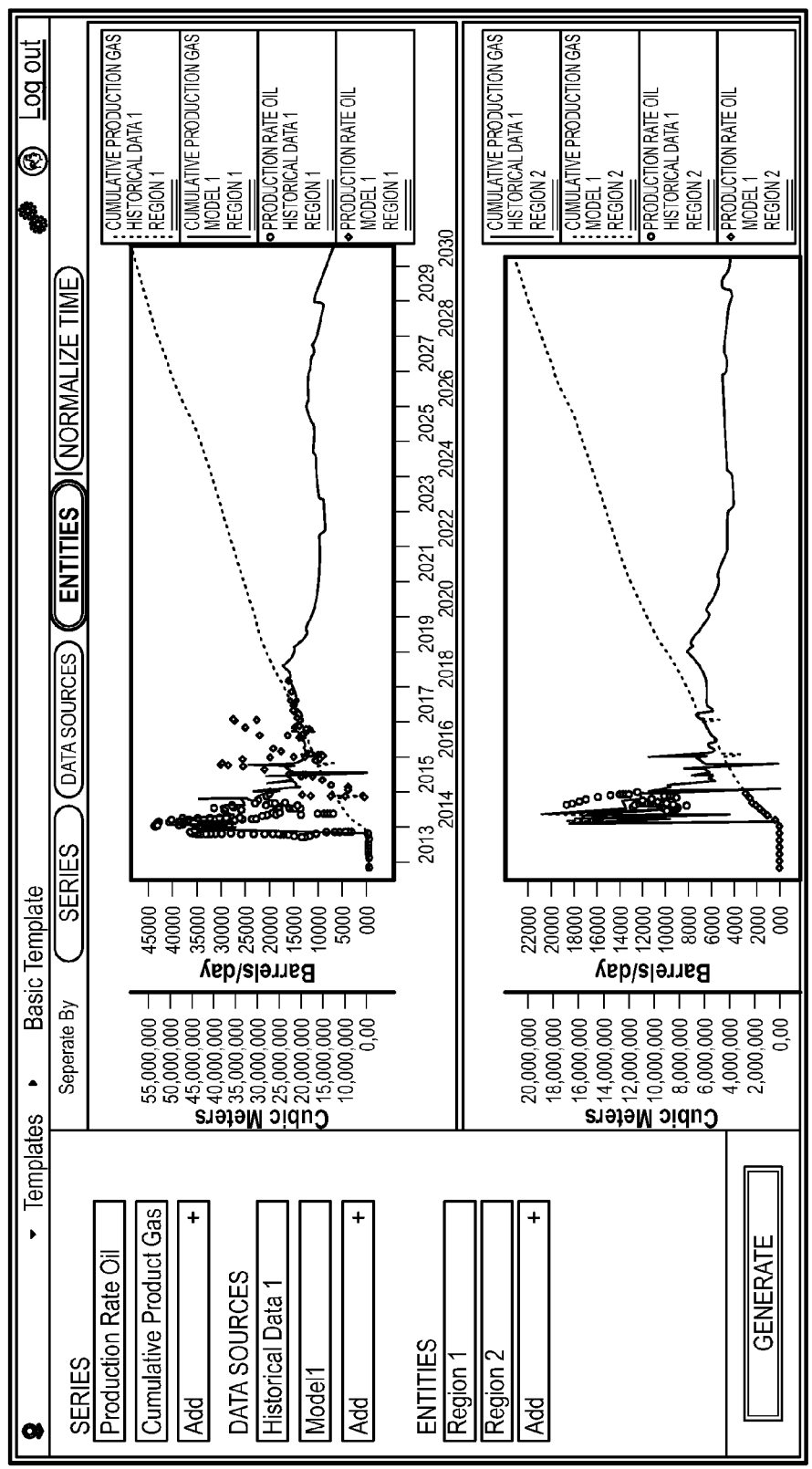

FIG. 7J illustrates an interface where a user has selected two series, two data sources, and two entities. In the illustrated example, the two data sources comprise a historical data source and a model data source. The charts are separated by entity such that two charts are displayed: a first chart showing the two data series for each data source (historical and model) for the first selected entity, and a second chart showing two data series for each data source (historical and model) for the second selected entity. For example, the first chart contains the historical oil production rate, model oil production rate, historical cumulative gas production, and model cumulative gas production for the first entity.

Figure 7K:
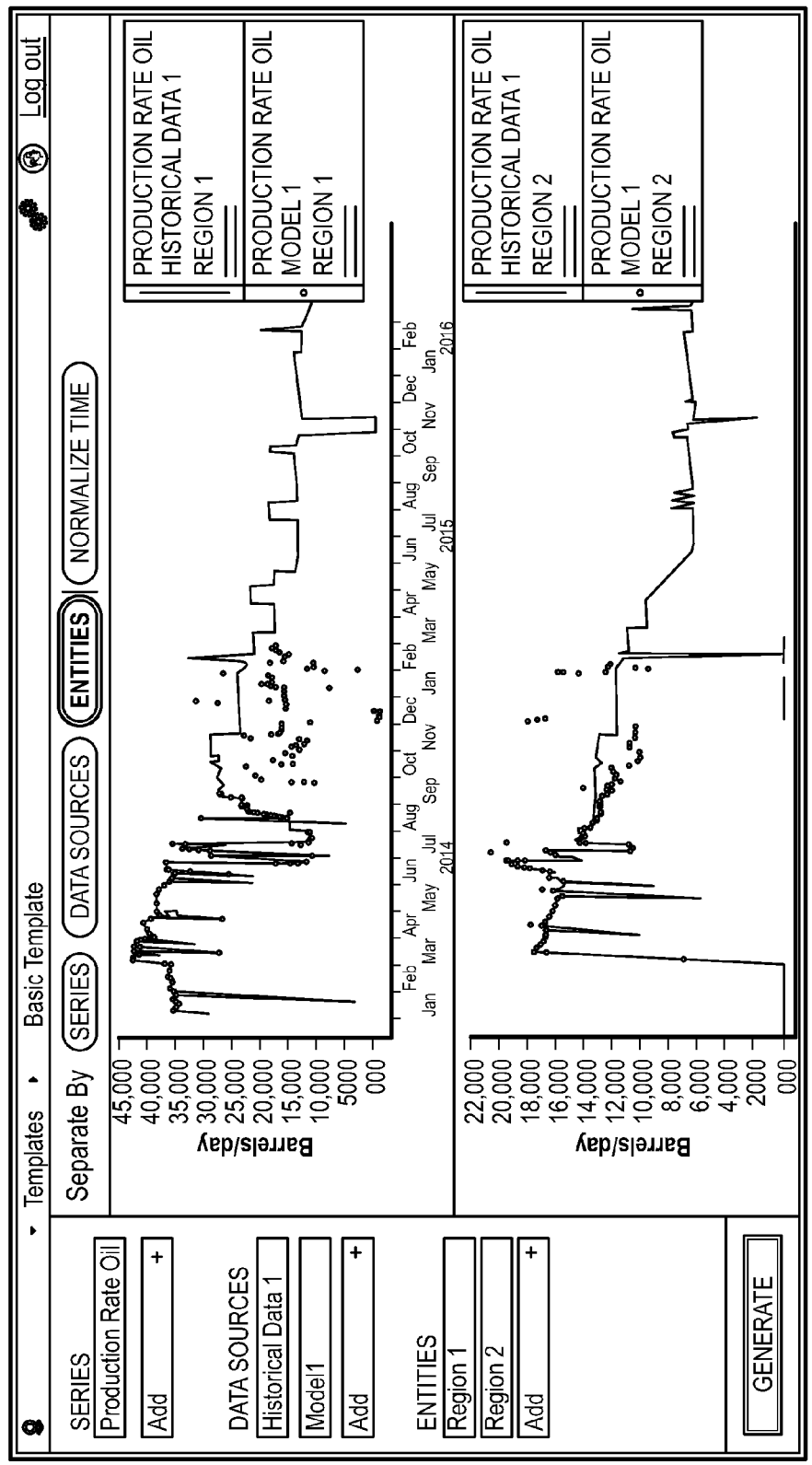

FIG. 7K illustrates an interface where a user has selected one series, two data source, and two entities, and has selected that the charts be separated by entity. As a result, two charts are created, a first chart showing the series value as computed by the two data sources for the first entity, and a second chart showing the series value as computed by the two data sources for the second entity. In the illustrated example, the two data sources comprise a historical data source and a model data source. As can be seen in the generated charts, the model data source series (shown as a line graph) follows the historical data source series (shown as a scatter plot) closely until a certain point in time, whereupon the model data source begins to diverge from the historical data. This may indicate the date when the model was first produced, as the model may have been constructed to adhere closely to the historical data that was recorded before its creation, but may not always be able to accurately predict the value of the series after the model has been created. In addition, after a certain point in time, the scatter point corresponding to the historical data source stops, while the line graph corresponding to the model continues to predict future series values. By plotting a historical data source and a model data source on the same chart, the effectiveness of the model may thus be assessed by the user.

Workflow Templates

While being able to select any number of series, data sources, and/or entities may allow for a user to generate many different combinations of charts and visualizations, in some cases, the number of options available may be overwhelming or inconvenient for a user who only needs to perform a limited number of different tasks. There may be specific workflows that are frequently executed that make use of specific configuration options, and it may be desirable to be able to execute those workflows without having to configure those options each time the workflow is to be executed.

For example, a commonly used workflow may be one that compares two different data sources. A user may wish to compare a historical data source with a model data source, in order to assess how well the model is performing. Alternatively, the user may desire to compare two different models to see how they differ. In some embodiments, a model may be constructed based on the assumption of an occurrence of a particular event or condition. Different models may be compared in order to forecast how a series may change based upon whether or not the event or condition is fulfilled.

In some embodiments, templates corresponding to particular workflows may be defined and saved. By loading a saved template, configuration options associated with the workflow may be automatically set, saving time and also allowing users who may be unfamiliar with the configuration options to execute the workflow.

Figure 8:
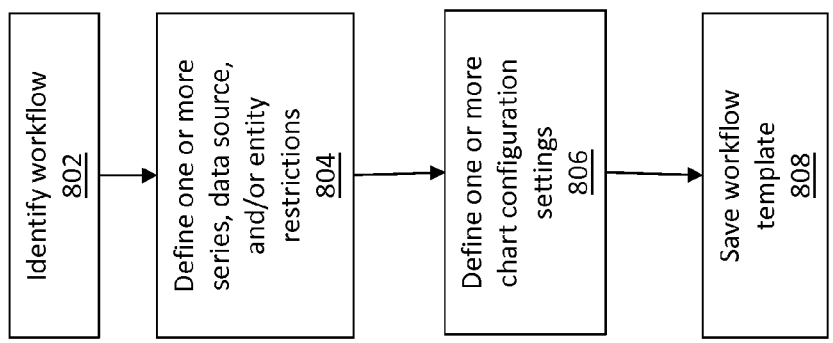
FIG. 8 illustrates a flowchart of a process for defining a workflow template in accordance with some embodiments.

FIG. 8 illustrates a flowchart of a process for defining a workflow template in accordance with some embodiments. In some embodiments, the process may be executed using the system illustrated in FIG. 1, such as by the user station 101 and/or the application server 102. Depending on the embodiment, the method of FIG. 8 may include fewer or additional blocks and/or the blocks may be performed in an order different than is illustrated.

At block 802, a workflow for which a template to be created is specified. The workflow may correspond to a workflow expected to be performed regularly, or have unique or seldom used configuration options. For example, a common workflow that may be performed may be a workflow to compare two different data sources (hereinafter also referred to as a "Profile Comparison" workflow). By creating a "Profile Comparison" template corresponding to the "Profile Comparison" workflow, a user will be able to perform the workflow by loading the template, without having to be familiar with the various configuration settings and options available in the application.

At block 804, one or more series restrictions, data source restrictions, and/or entity restrictions are defined. These restrictions may limit the number and/or type of series, data sources, and/or entities that may be selected in a particular workflow. For example, as described above, in some embodiments, a "basic template" may be used with any number of series, data sources, and/or entities. However, certain workflows may require a certain number of series, data sources, and/or entities. For example, a "Profile Comparison" workflow, used to compare two different data sources, may require the user to select two data sources. In addition, the user of the "Profile Comparison" workflow may only be able to select one series and one entity, so that the data sources being compared will be with reference to the same series and entity. As such, the "Profile Comparison" workflow may contain a series restriction restricting the number of selected series to one, an entity restriction restricting the number of selected entities to one, and a data source restriction restricting the number of selected data sources to two.

In some embodiments, restrictions may be placed on the types of series, data sources, and/or entities that can be selected (e.g., only model data sources, only reservoir entities, and/or the like). The restrictions may be defined based at least in part upon one or more user-specified criteria. The user may be presented with a user interface with which they may specify the criteria indicating restrictions associated with the workflow. For example, the user may wish to define a template for a workflow for comparing model data to historical data, and thus may define a data source restriction restricting the selected data sources to one historical data source and one model data source.

In some embodiments, at block 806, the user may also specify one or more configurations or restrictions regarding the charts that are generated. Certain charts or combinations of charts may be desired for certain workflows. For example, for a "Profile Comparison" workflow used to compare two different data sources, it would be useful to have a chart that plots a series for the different data sources, as well as a chart that plots a computed difference between the different data source series. By setting a configuration (e.g., a chart configuration specifying a first chart plotting a series for the first selected data source, a second chart plotting a series for the second selected data source, and a third chart plotting a difference between the first and second data sources), these charts may be automatically created once the user has specified the desired series, data sources, and entity, without the user having to set additional configuration settings or perform additional manipulations. At block 808, the workflow template is saved, allowing it to be later loaded and the workflow associated with the template to be performed by a user.

In some embodiments, the restrictions and configurations may be defined based upon one or more inputs from a user. The user may be different from a user who later performs the workflow (e.g., using the process illustrated in FIG. 6). For example the user from which the inputs are received may be an administrator or other personnel who is familiar with the restrictions and configuration settings associated with the workflow, while the user who performs the workflow does not have to be familiar with the settings and restrictions.

Figure 9A:
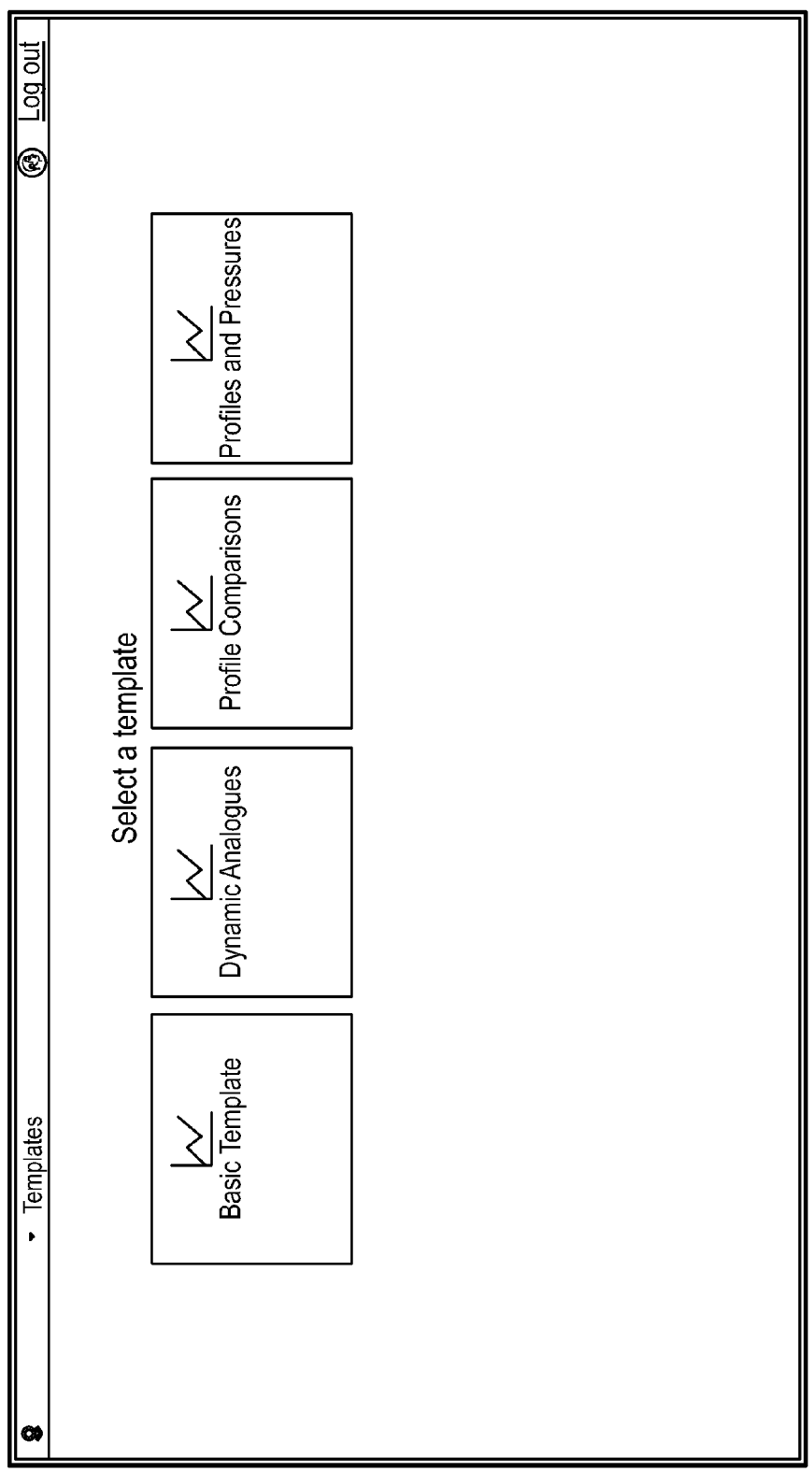
FIGS. 9A-B illustrates a chart creation interface being used with templates, in accordance in some embodiments.

FIG. 9A illustrates a template selection interface that may be used in accordance in some embodiments. When a user launches the chart creation tool or application, they may first select a template that they wish to use. For example, they may select the "Profile Comparisons" template in order to perform a workflow for comparing two different data sources. On the other hand, if there does not exist a specialized template associated with the workflow that the user wishes to perform, a "Basic Template" may be selected.

Figure 9B:
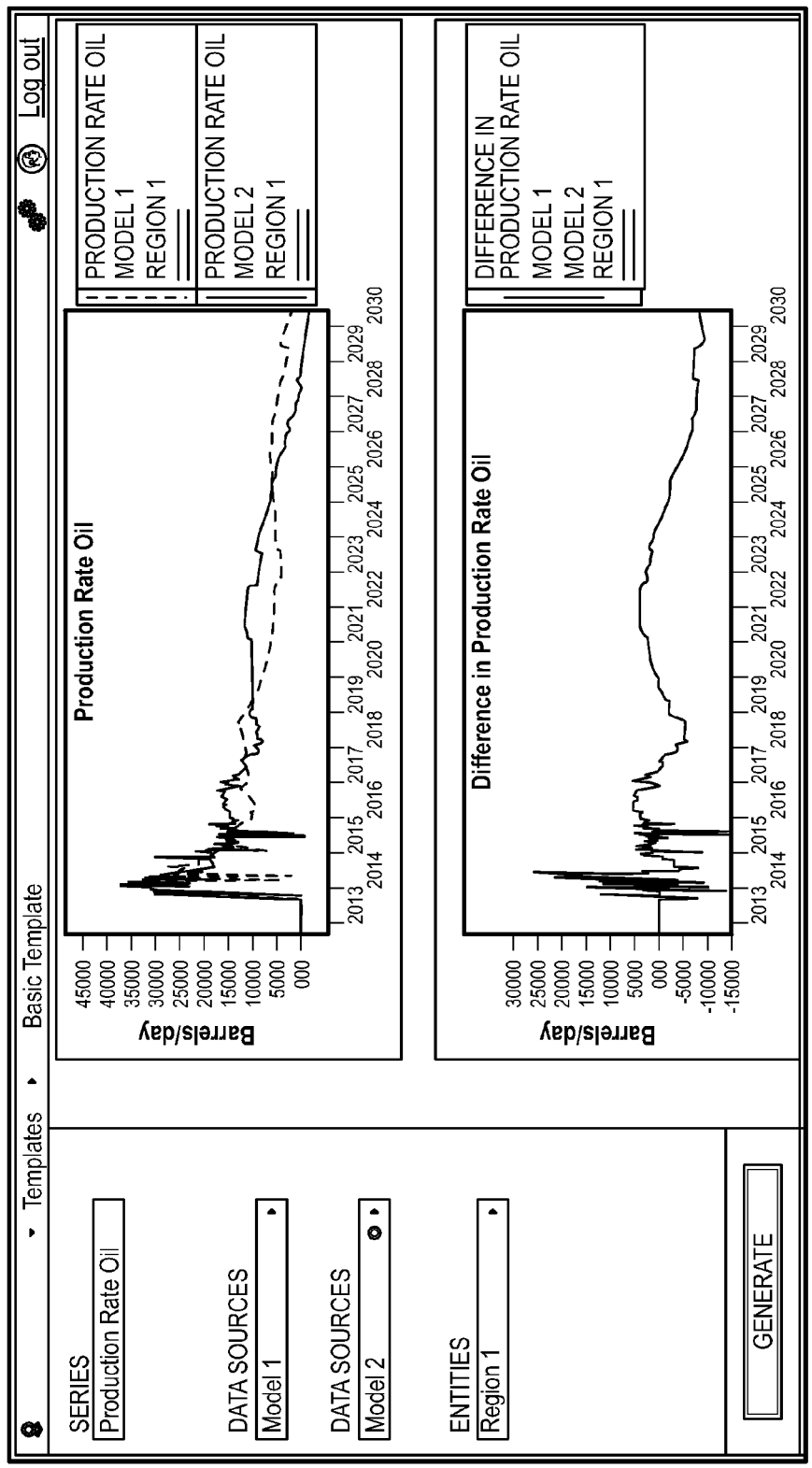

FIG. 9B illustrates an interface using a "Profile Comparisons" template, in accordance with some embodiments. As described above, the "Profile Comparisons" template may be used to compare two different data sources (e.g., models and/or historical data). In some embodiments, the data sources may comprise a historical data source and a model data source, allowing the user to assess how well the model has been performing compared to the actual recorded data. Alternatively, two different model data sources may be selected, allowing the user to assess how the models perform relative to each other. In some embodiments, different models may be constructed based upon an assumption that some event or condition has occurred (e.g., if an additional investment is made, if a particular advertising campaign is adopted, and/or the like). For example, a first model may be constructed based upon an assumption of a first event or condition, while a second model may be constructed based on an assumption of a different event or condition. By comparing the two models, the user may be able to determine how the series will be expected to behave in different "what if" scenarios.

As illustrated at display area 902, the user is only able to select a single series, two different data sources, and a single entity. Upon the user having selected the desired series, entity, and data sources, two charts are created in display area 904, a first chart that plots the two data source series for the selected entity against each other, and a second chart that plots the difference between the two data source series. Thus, a user will be able to easily assess how the data sources compare and are different from each other.

Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

For example, FIG. 10 is a block diagram that illustrates a computer system 1000 upon which an embodiment may be implemented. For example, any of the computing devices discussed herein may include some or all of the components and/or functionality of the computer system 1000.

Computer system 1000 includes a bus 1002 or other communication mechanism for communicating information, and a hardware processor, or multiple processors, 1004 coupled with bus 1002 for processing information. Hardware processor(s) 1004 may be, for example, one or more general purpose microprocessors.

Computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions. Main memory 1006 may also store cached data, such as zoom levels and maximum and minimum sensor values at each zoom level.

Computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions. For example, the storage device 1010 may store measurement data obtained from a plurality of sensors.

Computer system 1000 may be coupled via bus 1002 to a display 1012, such as a cathode ray tube (CRT) or LCD display (or touch screen), for displaying information to a computer user. For example, the display 1012 can be used to display any of the user interfaces described herein with respect to FIGS. 1A through 8. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 1000 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1010. Volatile media includes dynamic memory, such as main memory 1006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 406, from which processor 1004 retrieves and executes the instructions. The instructions received by main memory 1006 may retrieve and execute the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN (or WAN component to communicated with a WAN). Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and/or communication interface 1018. In addition, a database 1040 may be accessed by computer system and/or server 1030 through Internet 1028, ISP 1026, local network 1022 and/or communication interface 1018.

The received code may be executed by processor 1004 as it is received, and/or stored in storage device 1010, or other non-volatile storage for later execution.

Terminology

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computing system configured to create a template by a template creator for a workflow chart template, wherein the workflow chart template can be used by a template user to automatically generate one or more workflow charts based on analysis of attributes values of sensors associated with a plurality of entities, each entity generating attribute values of sensors over time, the computing system comprising:

a computer processor;

one or more databases storing data generated by the plurality of entities, the data comprising sensor data generated by the entities by sensors located at each entity for collecting the sensor data, the sensor data comprising:

a plurality of time series, each time series comprising values of an attribute over time, wherein the attribute values indicate characteristics or features of the entity and are measured by the sensors, wherein each of the attribute values are measured by one or more sensors, each of the time series configured to be plotted on workflow charts with the Y axis indicating the attribute values of the times series and the X axis indicating time;

wherein each of the time series is associated with one or more of a plurality of data sources, the plurality of data sources including:

one or more historical data sources of actual sensor data measured at each entity; and one or more modeled data source comprising modeled attribute values generated by one or more models for modeling time series data; and a computer readable storage medium storing program instructions configured for execution by the computer processor in order to cause the computing system to:

create a workflow chart template based on input from the template creator and usable by the template user to automatically create a plurality of workflow charts, each workflow chart indicating attribute values of at least one time series, wherein the workflow chart template is configured responsive to selections of criteria by the template creator, wherein the criteria comprise attributes, configuration settings and data restrictions including one or more of:

time series selectable by the template user;

data sources selectable by the template user; and entities selectable by the template user;

wherein the workflow chart template is configured to receive selections of one or more time series, data sources, and entities from the template user in accordance with the criteria of the workflow chart template, wherein the selections of one or more entities comprises selection of a baseline comparison entity, one or more actual entities other than the baseline comparison entity, or one or more prospective hypothetical entities;

wherein the workflow chart template is configured to further receive from the template creator indications of how time series selected by the template user are to be combined in generated workflow charts, wherein the workflow chart template is configured to, in response to a first selection from the template creator, automatically cause generation of each of the time series selections on the Y axis and to plot time on the X axis on a single workflow charts, wherein the workflow chart template is configured to automatically plot on the Y axis each of the attribute values measured by the one or more sensors associated with the time series selections over a time period plotted on the X axis;

in response to a second selection from the template creator, automatically cause multiple workflow charts to be separated by time series such that when the template user selects a first time series and a second time series, a first workflow chart plots the first time series on a first Y axis and time on a first X axis, and a second workflow chart plots the second time series on a second Y axis and time on the second X axis;

in response to a third selection from the template creator, automatically cause multiple workflow charts to be separated by entity such that when the template user selects a first entity and a second entity, a first workflow chart plots one or more time series selections associated with the first entity on a first Y axis and time on a first X axis, and one or more time series selections associated with the second entity on a second Y axis and time on the second X axis; save the workflow chart template; and perform workflow chart creation using the workflow chart template by:

loading the saved workflow chart template;

based on the saved workflow chart template, including the criteria for time series, data sources, or entities, automatically determining one or more entities most similar to the baseline comparison entity and generating an interactive user interface comprising user interface elements allowing the template user to select one or more time series, one or more data sources, and one or more of the most similar entities for display in the interactive user interface in one or more workflow charts;

receiving selection of one or more time series, data sources, or entities from the template user;

based on the workflow chart template determined by the template creator, analyzing the received selection of one or more time series, data sources, or entities from the template user to determine reconfigurations of the interactive user interface to dynamically separate or combine workflow charts using different portions of the time series data associated with the selected one or more time series, data sources, or entities, wherein the reconfigurations of the interactive user interface include at least one dynamic adjustment to a display area of the interactive user interface to partition the display area for the single workflow chart in response to a first selection by the user to replace the single workflow chart with two workflow charts responsive to the second selection or third selection by the template user, in particular:

if the first selection is indicated in the workflow chart template, automatically generate a single workflow chart indicating each of the time series selections by the template user on the Y axis and time on the X axis;

if the second selection is indicated in the workflow chart template, automatically generate a first workflow chart plotting a first time series selected by the template user on a first Y axis and time on a first X axis, and plotting a second time series selected by the template user on a second workflow chart plotting a second time series selected by the template user on a second Y axis and time on the second X axis;

if the third selection is indicated in the workflow chart template, automatically generate a first workflow chart plotting one or more time series associated with a first entity selected by the template user on a first Y axis and time on a first X axis, and a second workflow chart plotting one or more time series associated with a second entity selected by the template user on a second Y axis and time on the second X axis;

wherein each of the workflow charts depicts attribute values of physical sensors measured at or modeled for each of the entities selected by the template user for the corresponding time series and obtained from the one or more data sources selected by the template user, whereby comparison of the attribute values of the entities is enhanced.

2. The computing system of claim 1, wherein the plurality of entities correspond to a plurality of geological structures.

3. The computing system of claim 1, wherein the one or more modeled data sources are constructed based at least in part upon attribute values of sensors indicated in one or more of the historical data source.

4. The computing system of claim 1, wherein the workflow chart creation further comprises selecting one or more entities based at least in part upon similarity to a baseline entity selected by the template user.

5. The computing system of claim 4, wherein a similarity of an entity to the baseline entity is determined based at least in part upon a calculated similarity score, the similarity score being calculated as a weighted average.

6. The computing system of claim 1, wherein criteria received from the template creator indicate one or more restrictions on a number of series, number of data sources, or number of entities that can be received by the template user.

* * * * *

UNITED STATES PATENT AND TRADEMARK OFFICE
CERTIFICATE OF CORRECTION

PATENT NO. : 9,886,467 B2
APPLICATION NO. : 14/813749
DATED : February 6, 2018
INVENTOR(S) : Feridun Arda Kara et al.

It is certified that error appears in the above-identified patent and that said Letters Patent is hereby corrected as shown below:

On the Title Page

Item (73), (Assignee) at Line 1, Change "PLANTIR" to --PALANTIR--.

Signed and Sealed this
Fifteenth Day of May, 2018

Andrei Iancu
*Director of the United States Patent and Trademark Office*